United States Patent [19]

Wiener

[11] Patent Number: 5,274,987
[45] Date of Patent: Jan. 4, 1994

[54] MANUAL POWERED LAWN MOWER

[76] Inventor: David M. Wiener, 152 Hills Point Rd., Westport, Conn. 06880

[21] Appl. No.: 853,499

[22] Filed: Mar. 18, 1992

[51] Int. Cl.$^5$ .................. A01D 34/73; A01D 34/77
[52] U.S. Cl. ................................ 56/14.8; 56/255; 56/295; 74/13; 192/50
[58] Field of Search .............. 56/14.8, 17.1, 255, 56/295; 74/13; 192/50; 123/185.15; 172/14

[56] References Cited

U.S. PATENT DOCUMENTS

| 5,931 | 11/1848 | Boone | 56/255 |
|---|---|---|---|
| 270,090 | 1/1883 | Martin | 56/255 |
| 437,808 | 10/1890 | Batcheller | 56/239 |
| 498,533 | 5/1893 | Clousing | 56/255 |
| 703,513 | 7/1902 | Adams et al. | 56/255 |
| 1,221,204 | 4/1917 | Montague | 56/255 |
| 1,351,185 | 8/1920 | Muzzy | 56/255 |
| 1,591,775 | 7/1926 | Perling | 56/255 X |
| 1,759,569 | 5/1930 | Forsberg | 56/239 |
| 1,784,327 | 12/1930 | Allen | 56/255 |
| 2,032,701 | 3/1936 | Jones | 56/238 |
| 2,083,103 | 6/1937 | Steiner | 56/255 |
| 2,132,465 | 10/1938 | Gast | 56/255 |
| 2,171,750 | 9/1939 | Hooe | 56/255 |
| 2,504,268 | 4/1950 | Lee | 56/255 |
| 3,073,101 | 1/1963 | Beaman et al. | 56/249 |
| 3,184,907 | 5/1965 | Harloff | 56/295 |
| 3,481,124 | 12/1969 | Machovina | 56/255 |
| 3,971,196 | 7/1976 | Stevenson | 56/17.1 |
| 4,090,346 | 5/1978 | Doi | 56/13.6 |
| 4,341,058 | 7/1982 | Chun | 56/2 |
| 4,706,446 | 11/1987 | Doi et al. | 56/295 |

OTHER PUBLICATIONS

The 1992 DR Trimmer/Mower Catalog.
Troy-Bilt Mulching Mower Advertisement, 1992.
AgriFab Advertisement (undated).
Gardenia Advertisement (undated).
Plow & Hearth Advertisement (undated).
Homelite Advertisement (undated).
John Deere Advertisement (undated).

*Primary Examiner*—David J. Bagnell
*Attorney, Agent, or Firm*—David P. Gordon

[57] ABSTRACT

A manual powered lawn mower comprises a pair of large diameter drive wheels on an axle, two clutch and roller bearing mechanisms on the axle coupling the drive wheels thereto, a gear mechanism coupled to the axle for translating rotation of the drive wheels to rotation of a gear around a vertical axis, and a rotary type blade which is coupled to the gear mechanism via a vertical axle and another clutch and roller bearing mechanism. When the lawn mower is pushed forward, the clutch and roller bearing mechanisms on the wheel axle causes the axle to drive the gear mechanism, which in turn drives the vertical axle and the blade. When a drive wheel is not turning the axle faster than the speed that the axle is turning, that drive wheel is decoupled by the clutch and roller bearing mechanism and no longer adds either power or drag to the system. With clutch and roller bearing mechanisms on each wheel, a "differential" is provided which permits maneuverability without adversely affecting blade speed. The clutch and roller bearing mechanism coupling the blade to the vertical axle permits the vertical axle to drive the blade provided the vertical axle is rotating as fast as the blade, but permits the blade to spin unimpeded otherwise. Numerous blade arrangements are provided, including inertial blades which ease lawn mower start-up, and different attachment modules are provided which convert the mower into a sweeper, mulcher, lawn edger, lawn thatcher, etc.

29 Claims, 18 Drawing Sheets

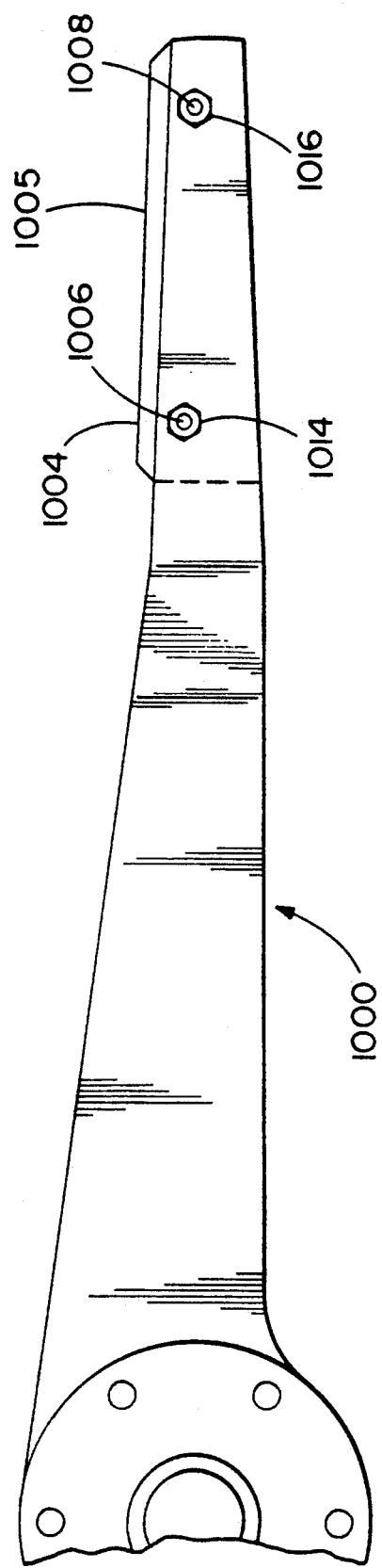
FIG. 6(a)
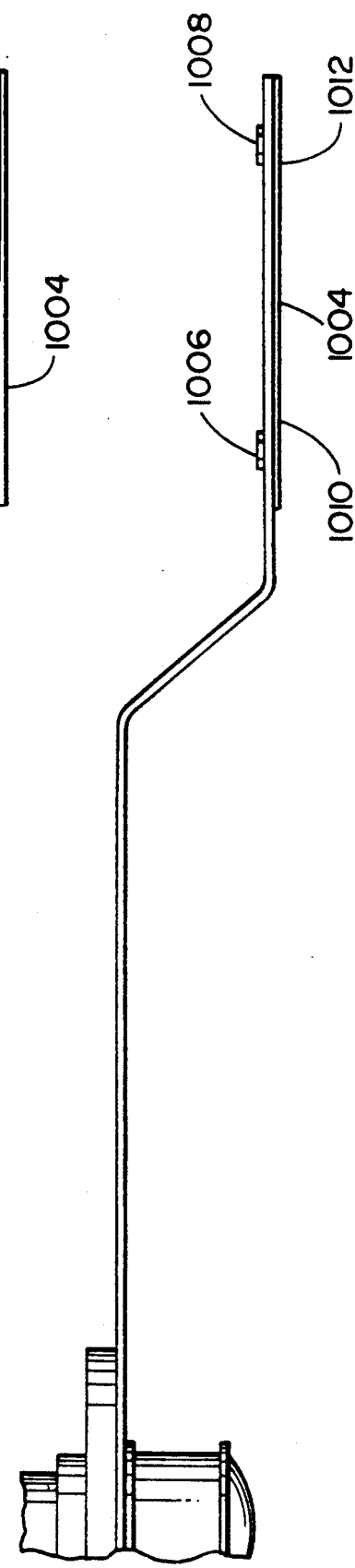
FIG. 6(b)
FIG. 6(c)

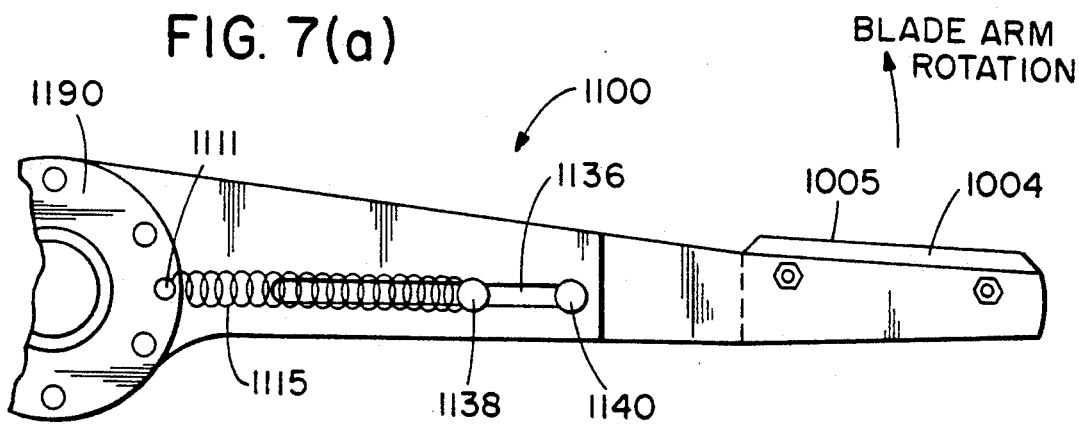
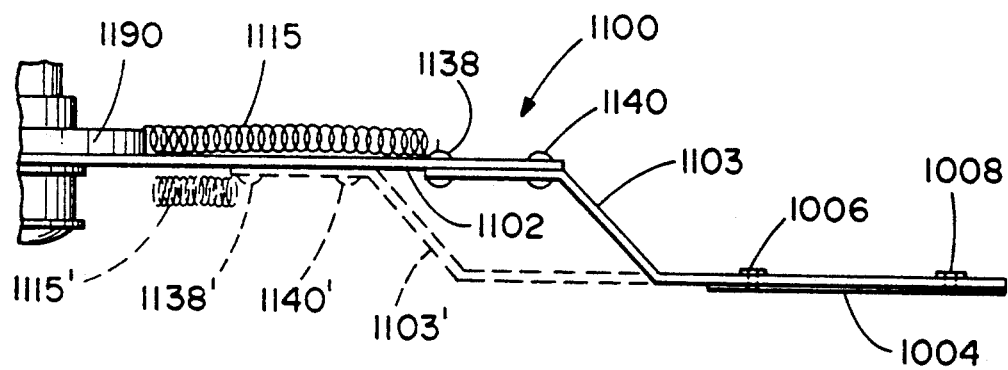
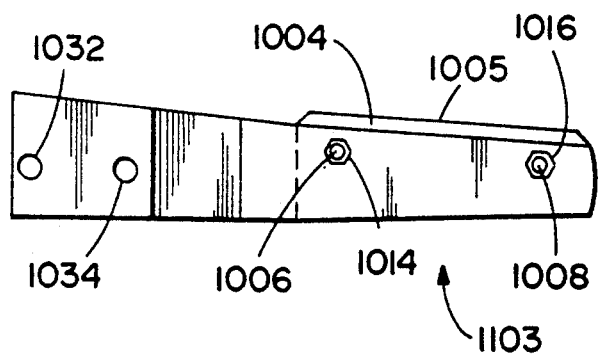
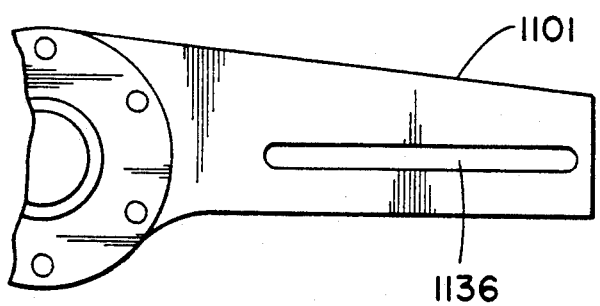

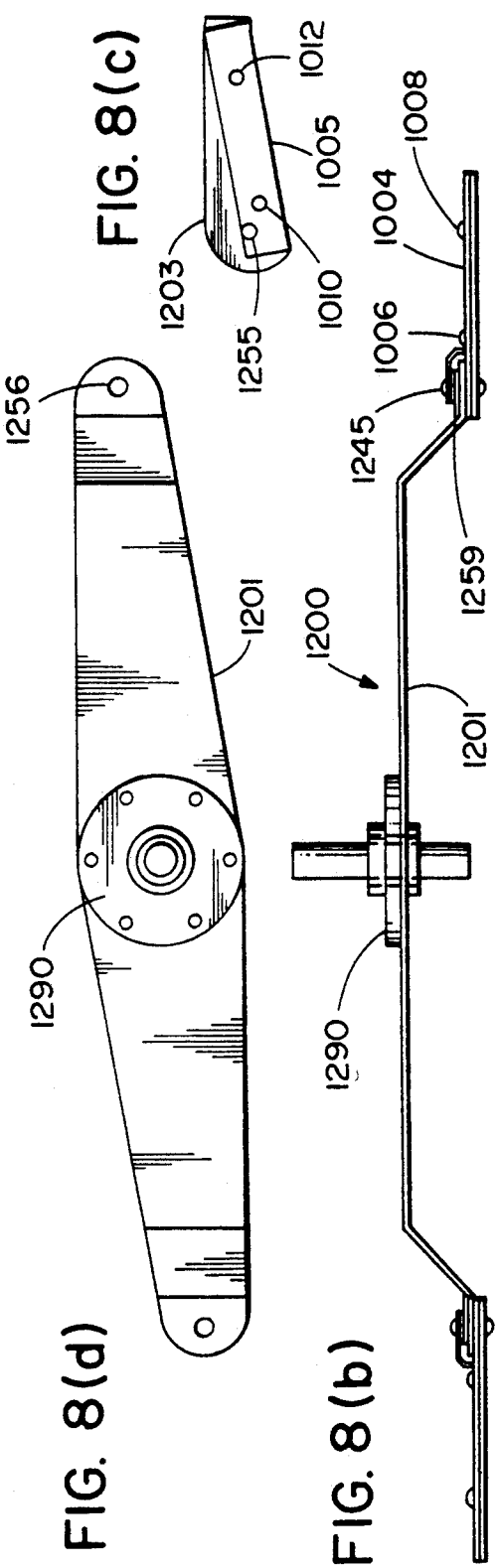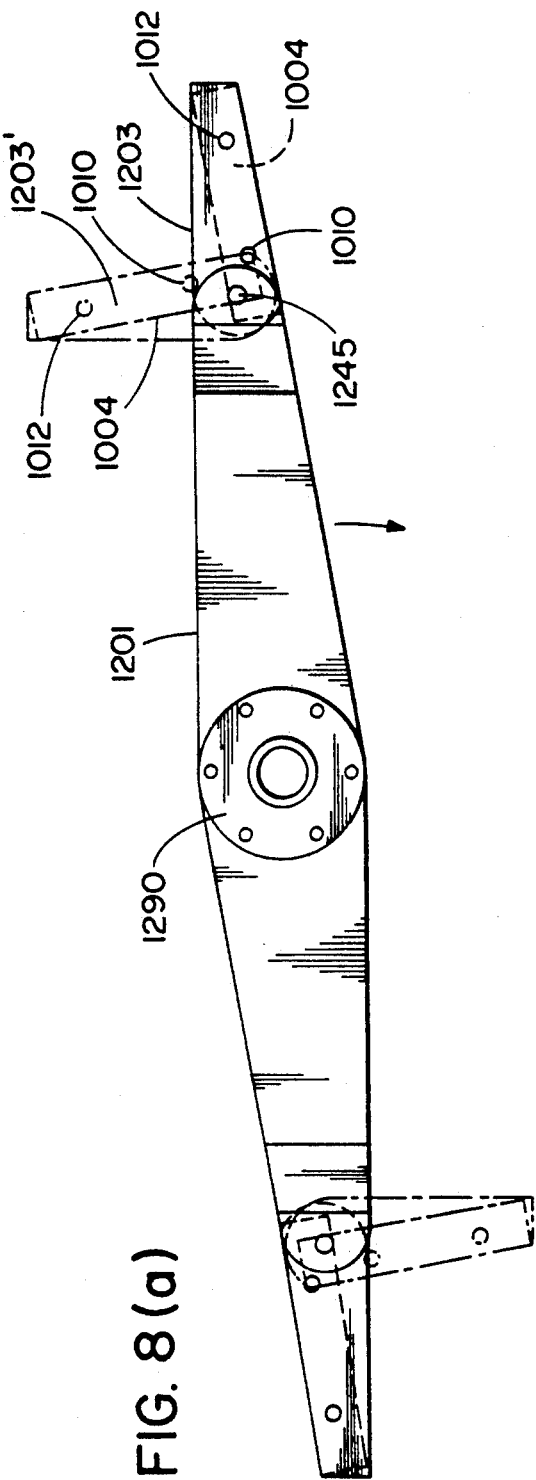

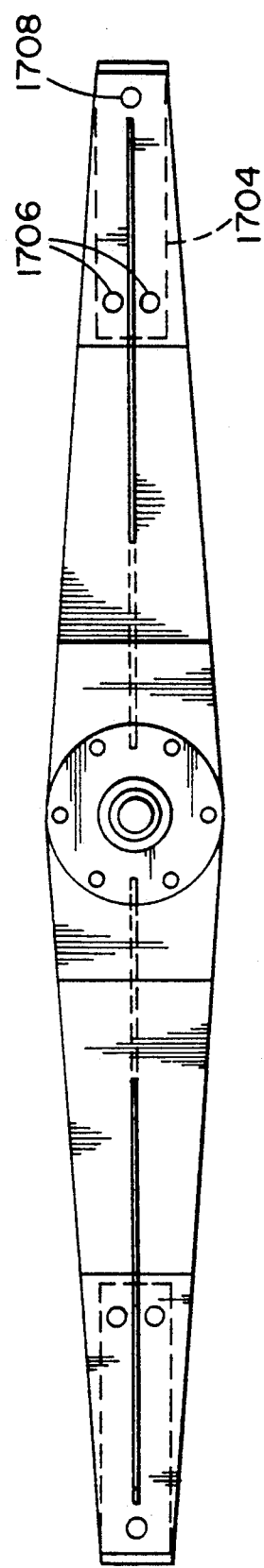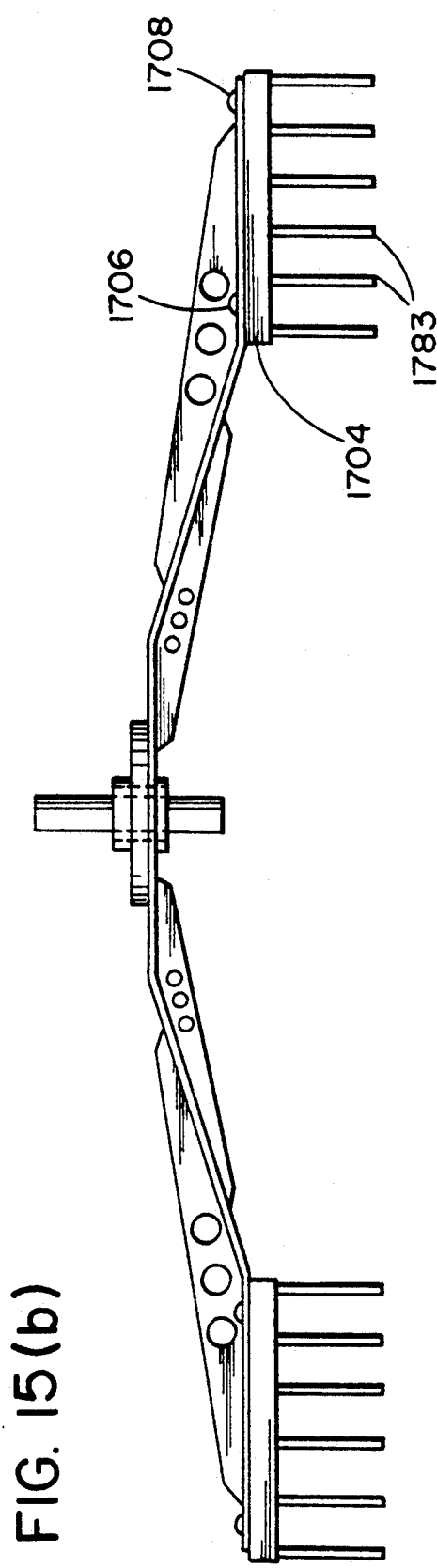
FIG. 15(a)
FIG. 15(b)

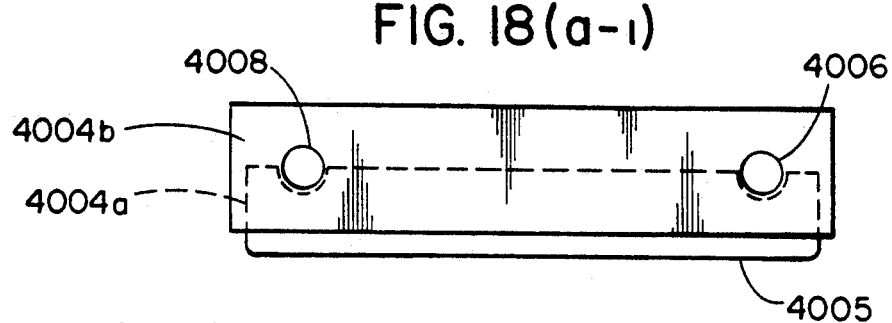
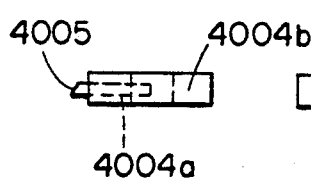
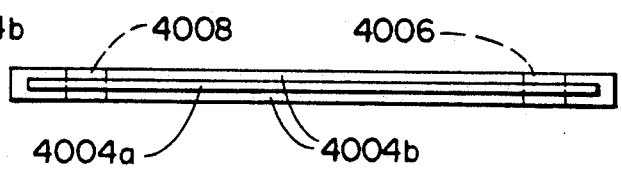
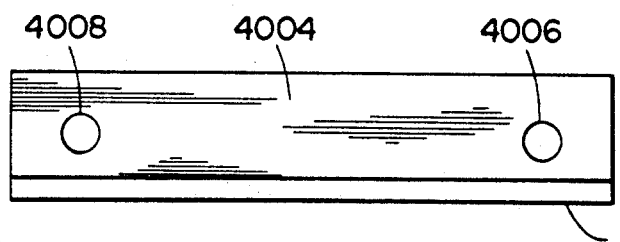
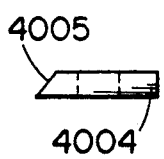
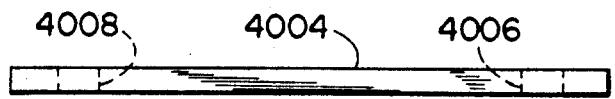
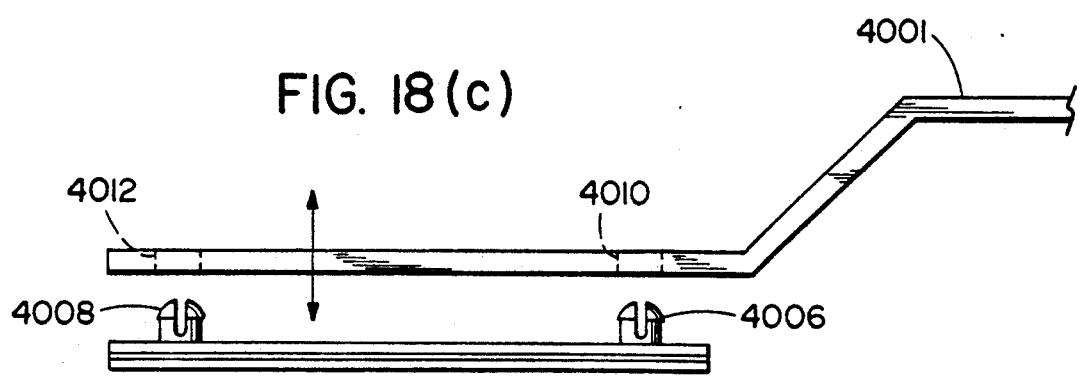

MANUAL POWERED LAWN MOWER

BACKGROUND

1. Field of the Invention

This invention generally relates to lawn mowers. More particularly, this invention relates to a manual powered lawn mower; i.e., a lawn mower without a motor, which provides the performance of a motor powered lawn mower.

2. State of the Art

Lawn mowers of many types have long been known in the arts. A common old style of lawn mower is the reel-type blade with its multiple cutting bars, such as seen in U.S. Pat. No. 437,808 to Batcheller. Because the reel-type blade mower has multiple curved blades, it is expensive to manufacture and sharpen. In addition, the reel-type blade mower only performs adequately when the grass which it is cutting is very short, because a fan action of the multiple rotating blades creates a wind force that actually pushes longer grasses flat before the blades reach them for cutting.

While less common in the old style lawn mowers, rotary blade mowers, which are common today as motor powered lawn mowers, were also well known to the arts. Examples of early manual rotary blade type mowers are seen in U.S. Pat. Nos. 5,931 to Boone, 270,090 to Martin, 498,533 to Clousing, and 703,513 to Adams and Hough. Common to the manual rotary blade type mowers is that a bevel gear is used to translate the power provided by the wheels of the mower so that rotation of the blade can be around an axis perpendicular to an axis around which the wheels rotate.

With the advent of inexpensive, compact motors, the motor powered lawn mower substantially displaced the market for manual powered lawn mowers. Not only are the motor powered lawn mowers easier to handle, but the cut provided with a high speed rotary blade is typically superior to that available with manual powered mowers. Thus, while occasional manual powered mowers have recently been designed, such as U.S. Pat. No. 4,341,058 to Chun which provides a bicycle/mower for exercise purposes, for the most part, the advances in the art have been in motor powered mowers. However, due to environmental concerns relating to gas powered mowers, laws have recently been enacted in various jurisdictions which favor manual powered mowers.

SUMMARY OF THE INVENTION

It is therefore an object of the present invention to provide an effective manual powered rotary type lawn mower.

It is another object of the invention to provide a manual powered rotary type lawn mower which is easy to push and whose blade speed will approach or equal that of motor powered mowers.

It is a further object of the invention to provide a manual powered rotary type lawn mower which can be easily turned around corners without adversely affecting the blade speed.

Another object of the invention is to provide a manual powered rotary type lawn mower with an inertial blade system which permits easy start-up and which provides a wide path cut upon reaching a post start-up speed.

A further object of the invention is to provide different type inertial blade systems for manual lawn mowers which permit easy start-up of the lawn mowers.

Yet another object of the invention is to provide a generic manual power mechanism to which different attachment mechanisms may be attached for outdoor lawn, garden and patio jobs.

Even a further object of the invention is to provide a manual powered rotary type lawn mower with an easily adjustable blade height which is not dependent on the housing height.

Even another object of the invention is to provide a manual powered rotary type lawn mower which produces little noise.

In accord with the objects of the invention, a manual powered lawn mower is provided and generally comprises a pair of horizontally disposed axle, two clutch and roller bearing means on the horizontal axle to couple each drive wheel to the horizontal axle, a gear mechanism coupled to the axle, which gear mechanism translates rotation of the drive wheels around the horizontal axle to rotation of a gear around a vertical axis, and a rotary type blade which is coupled to the gear mechanism via a vertical axle and another clutch and roller bearing means. The gear mechanism, which is preferably a step-up mechanism having a plurality of gears, including a bevel gear, is preferably attached to and covered by a frame through which the axles extend with the provided arrangement, when the lawn mower is pushed forward, the clutch and roller bearing means cause the axle to drive the gear mechanism, which in turn drives the vertical axle and the blade. At such time when one or both of the drive wheels are not turning the horizontal axle faster than the speed that the axle is turning due to the inertial forces set up in the system, the one or both drive wheels will no longer add power to the system, but also will not add drag (friction) to the system, because the wheels will be effectively decoupled due to the clutch and roller bearing means. The clutch and roller bearing means in the wheels thereby also provide a "differential" for the wheels, thereby permitting the lawn mower to be easily maneuvered around corners as well as backed up without adversely affecting the blade speed. The clutch and roller bearing means which couples the blade to the vertical axle and hence to the gear mechanism also works in a similar manner to permit the blade to be coupled to the vertical axle as long as the vertical axle is rotating as fast as the blade, and to spin unimpeded by the vertical axle and gear mechanism if the vertical axle is not moving as fast as the blade. Thus, the blade will continue to spin when force is no longer applied to the mower, until the friction applied by the grass stops the blade.

One advantageous aspect of the invention includes a gear mechanism having a bevel gear coupled to the horizontal axle, a vertical shaft coupled to the bevel gear with a large timing pulley attached thereto, a second smaller pulley connected to the timing pulley by an endless belt, a large driving gear connected to the smaller pulley by a second vertical shaft, and a smaller gear engaged with the large driving gear, where the smaller gear drives the vertical axle on which the blade is coupled. The gear mechanism preferably provides an at least 20:1 step up ratio. Another advantageous aspect of the invention includes spacers on the vertical axle which act to adjust blade height.

In accord with another aspect of the invention, a plurality of different inertial blade arrangements are provided for the manual powered lawn mower of the invention. Each inertial blade includes a mechanism for holding a cutting element of the blade relatively close to the vertical axle when the blade is rotating slowly, and for permitting the cutting element to extend outwardly when the blade is rotating quickly. The inertial blade concept, regardless of exact implementation, permits the manual powered lawn mower to start up easily and quickly, as the force required to move the blade is initially small. Certain inertial blade embodiments also provide built-in safety aspects as well.

In accord with even another aspect of the invention, the generic manual power mechanism of the manual powered lawn mower is used as a module in conjunction with different attachment mechanisms or modules which may be attached for different outdoor lawn, garden and patio jobs. Thus, sweepers, mulchers, lawn edgers, and lawn thatchers are shown.

Additional objects and advantages of the invention will become apparent to those skilled in the art upon reference to the detailed description taken in conjunction with the provided figures.

BRIEF DESCRIPTION OF THE DRAWINGS

FIGS. 6a and 6b are respectively a top plan view and a side elevational view of a portion of a first preferred blade for the lawn mower of FIG. 1.

FIGS. 6c is a top plan view of the replaceable sharpened razor portion of the blade of FIGS. 6a and 6b.

FIGS. 7a and 7b are respectively a top plan view and a side elevational view of a portion of a first inertial blade embodiment of the invention.

FIGS. 7c and 7d are respectively top plan views of the moving lower blade carrying element, and the fixed slotted radial arm element of the first inertial blade embodiment of FIGS. 7a and 7b.

FIGS. 8a and 8b are respectively a top plan view and a side elevational view of a second inertial blade embodiment of the invention.

FIGS. 8c and 8d are respectively top plan views of the razor blade carrying element, and the fixed radial arm element of the second inertial blade embodiment of FIGS. 8a and 8b.

FIGS. 15a and 15b are respectively a top plan view and a side elevational view of a thatching blade attachment to the drive mechanism of FIG. 3.

FIGS. 18a-1, 18a-2, and 18a-3 are respectively a top plan view, a side elevational view and a cross-sectional view of a first preferred blade cartridge of the invention.

FIGS. 18b-1, 18b-2, and 18b-3 are respectively a top plan view, a side elevational view and a cross-sectional view of a second preferred blade cartridge of the invention.

FIG. 18c is an exploded view of the blade mechanism of the invention using the blade cartridge of FIGS. 18a-1 through 18a-3.

DETAILED DESCRIPTION OF THE PREFERRED EMBODIMENTS

Figure 1:
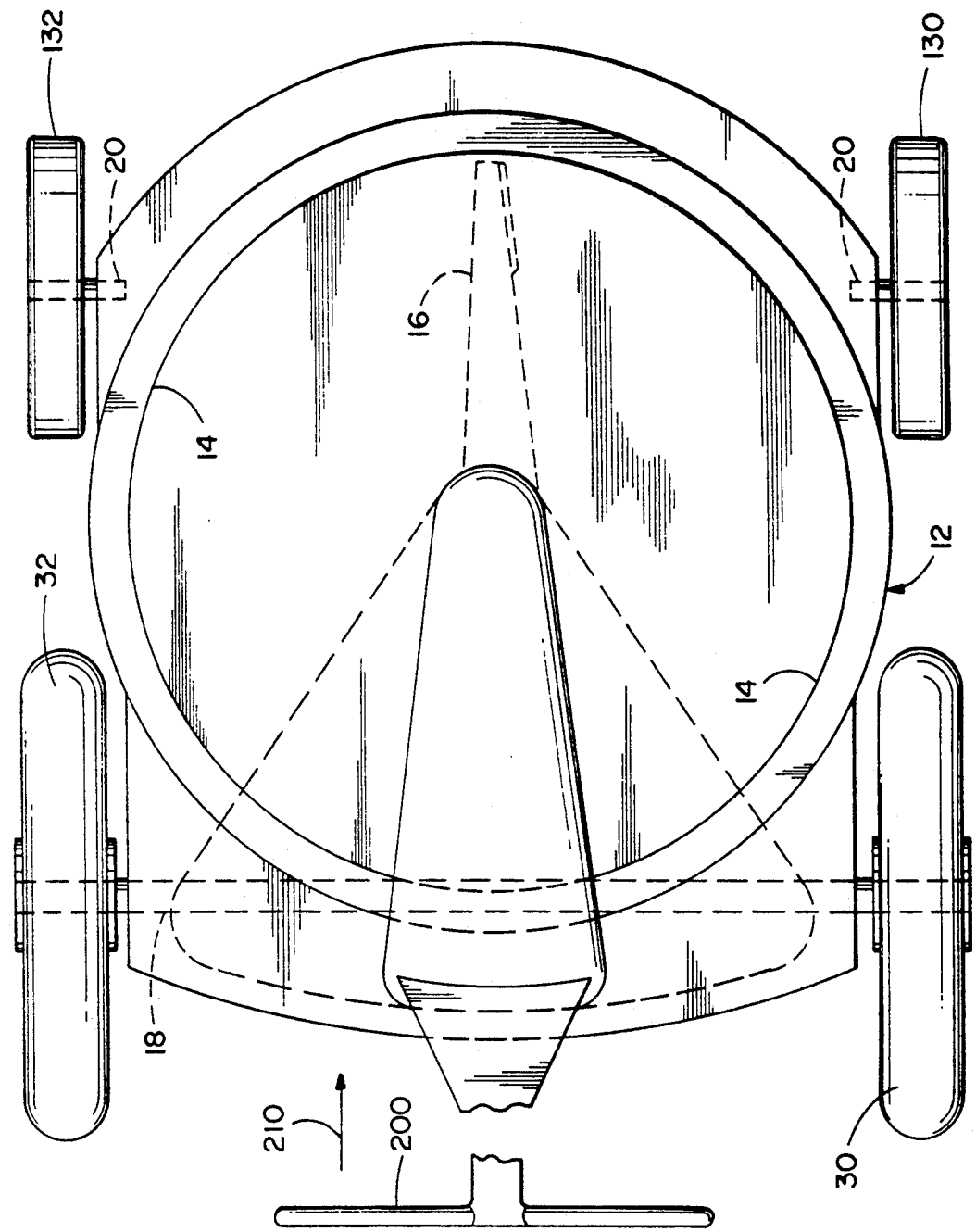
FIG. 1 is a top plan view of the manual powered lawn mower of the invention.
Figure 2:
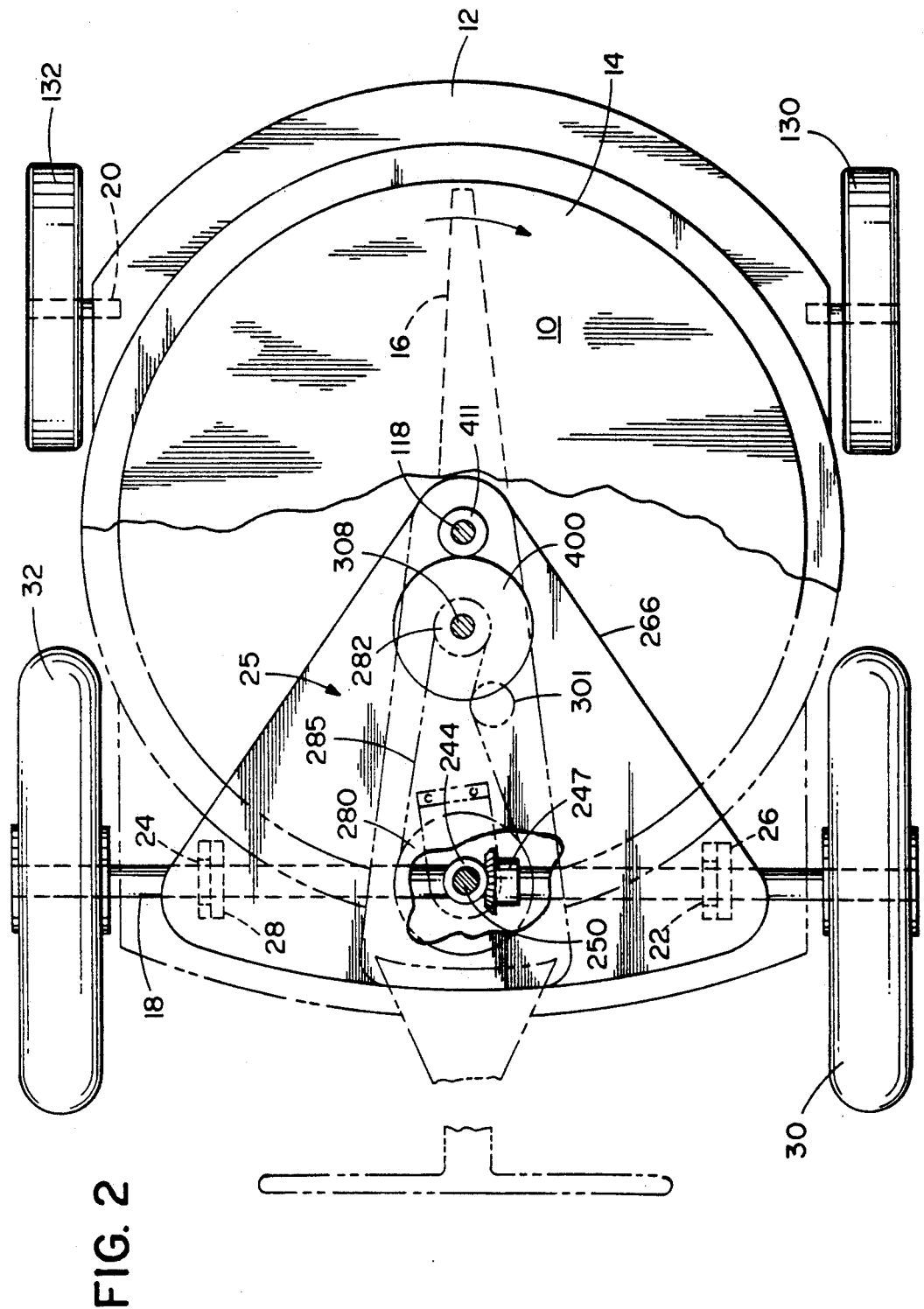
FIG. 2 is a partly broken away top plan view of the lawn mower of FIG. 1.

With reference to the drawings, and in particular to FIGS. 1-4, the lawn mower of the present invention is indicated generally at 10. The lawn mower of the invention generally comprises a housing/frame 12, a blade member 16 which is coupled via a clutch and roller bearing 242 to a vertical axle 118, a horizontal axle 18, drive wheels 30, 32 which are coupled to the horizontal axle 18 via clutch and roller bearings 34, 36, and a gear mechanism 25 which couples the horizontal axle 18 to the vertical axle 118.

The housing 12 of the lawn mower 10 is open at its bottom 14. The blade member 16, which is rotatably mounted and horizontally disposed, is preferably contained within the circumference and depth of housing 12. The housing 12, which is suitably made of sheet metal, or a strong plastic such as polystyrene, or from fiberglass, structural foam, polycarbonate, or ABS, or a combination thereof, rotatably supports a first rear axle 18 and forward axle stubs 20. The rear axle 18 is rotatably coupled via ball bearing 22, 24, or the like to and supported by axle support brackets 26, 28 extending from frame 12. The rear axle 18 are also coupled to the rear axle 18 at bearings 34, 36 which, if desired, may be part of clutch and roller bearing assemblies 40, 140 which will be described in more detail hereinafter. In the arrangement as aforedescribed, the axle 18 is free to rotate with respect to frame 12 because of bearings 22, 24, and the driving wheels 30, 32 are free to rotate with respect to the axle 18 in bearings 34, 36. Front wheels 130, 132 are typically either directly connected to axle stubs 20, or are coupled to the stubs via bearings (not shown).

As aforementioned, clutch and roller bearing means 40, 140 are provided. Clutch and roller bearing means 40 is fixedly engaged by bolts 43 to the hub 42 of drive wheel 30, while clutch and roller bearing means 140 is fixedly engaged by bolts 143 to the hub 142 of drive wheel 32. The clutch and roller assembly 40, and clutch and roller assembly 140 are essentially identical in the preferred embodiment of FIGS. 1-4 and are schematically illustrated in FIG. 5a.

Figure 5A:
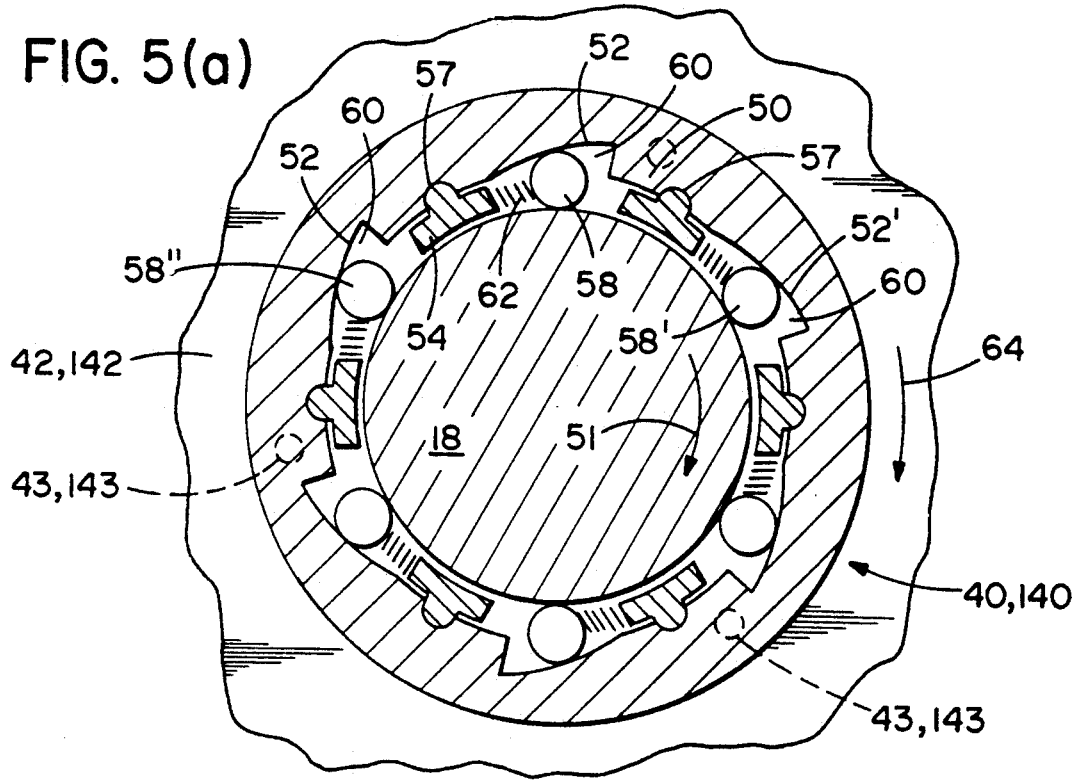
FIG. 5a and 5b are cross-sectional views the clutch and roller bearing mechanism used respectively in conjunction with the wheels and the blade of the lawn mower of FIG. 1.

With reference to FIG. 5a, a clutch housing 50 is fixedly engaged by bolts 43 (143) to the hub 42 (142) of the drive wheels 30 (32), although the clutch housing may be press fit into the hubs without use of bolts if desired. The horizontal axle 12 is surrounded by the clutch housing 50. The clutch housing 50 has peripheral ramped slots 52, 52′, 52″ . . . surrounding roller bearing 58, 58′, 58″ . . . which are resiliently attached via springs 62 to a roller clutch engagement means 54. The roller clutch engagement means 54 is fixedly engaged to clutch housing 50 at 57. Rollers 58, 58′, . . . are seated in respective ramped slots 52 of clutch housing 50, with roller 58 representing an "at rest" position for the clutch and the roller bearing means 40, 140. In the "at rest" position, roller 58 rests against axle 18, is spaced from the surface 50 of ramped slot 52, and is restrained in the "at rest" position by resilient spring 62. Upon rotations of hub 42, 142, as indicated at 64, with axle 18 stationary, the clutch housing 50 affixed thereto rotates with the hub 42, 142 and moves a short interval relative to the resiliently restrained roller 58. The resiliently restrained roller 58 slides along the peripheral surface of axle 18 until the surface 60 of ramped slot 52′ contacts and bears against the roller (as indicated by roller 58′), to thereby wedge the roller between the axle 18 and clutch housing 50. When the roller (e.g., 58′) is wedged, the axle 18 and the clutch housing 50 are effectively engaged, and the axle is caused to rotate with the clutch housing 50 as shown at 51. In the event that the speed of rotation of the clutch housing 50 decreases or reverses with respect to the axle 18, the axle 18 will continue to rotate independently of clutch housing 50 and will "overrun" the shaft 42 and housing 50. In this overrun or "freewheeling" mode of operation, rollers 58 advance slightly to the position indicated at 58″ (or 58), with the resiliently restrained roller bearing spaced from the surface 60 of ramped slot 52 and thus disengaged from the axle 18. In the freewheeling mode, bearings 34 will maintain the axle properly in the wheel 30.

Figure 5B:
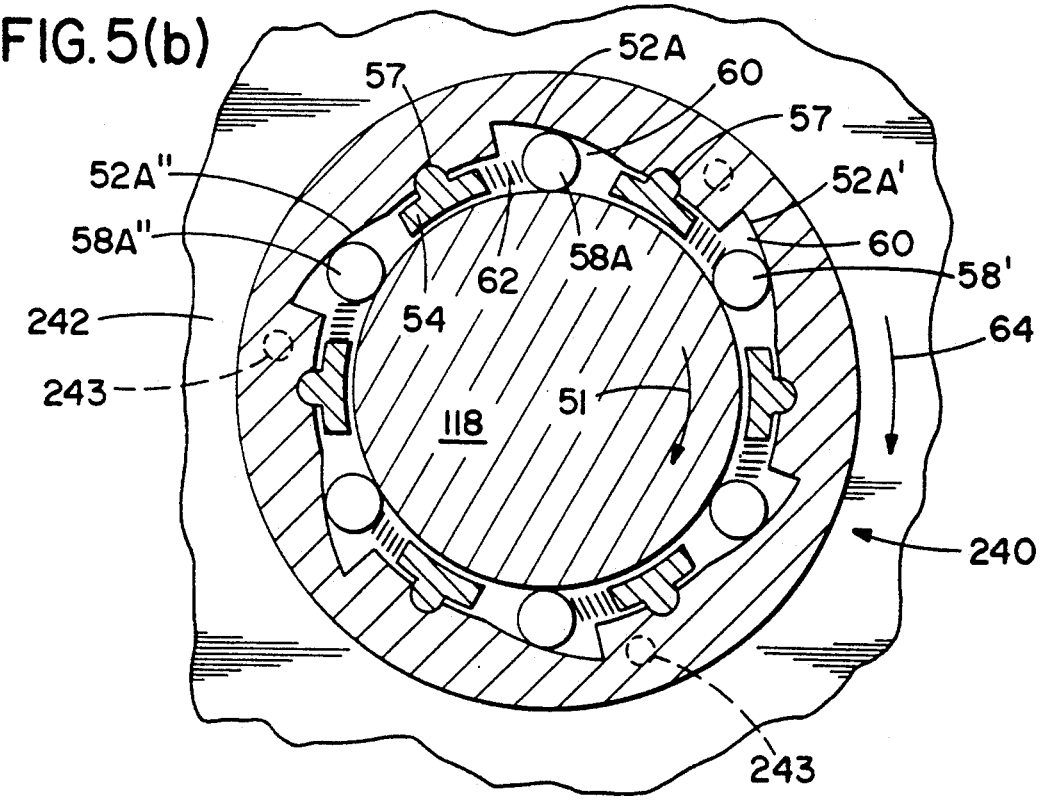

FIG. 5b shows a clutch and roller bearing assembly 240 of a similar type to that shown in FIG. 5a except that it is the rotation of the shaft 118 which causes rotation of a housing 50A. Clutch and roller bearing assembly 240 is used to engage vertical shaft or axle 118 to the hub 242 of the mower blade 16 as hereinafter described.

With reference to FIG. 5b a clutch housing 50A is fixedly engaged by bolts 243 to the hub 242 of blade 16. The housing 50A which surrounds shaft 118 has peripheral ramped slots 52A, 52A′, . . . surrounding roller bearings 58A, 58A′, 58A″ . . . which are resiliently attached via springs 62 to a roller clutch engagement means 54. The roller clutch engagement means 54 is fixedly engaged to clutch housing 50A at 57. Rollers 58A, 58A′, . . . are seated in respective ramped slots 52A of clutch housing 50, with bearing 58A representing an "at rest" position for the clutch and roller bearing means 240. In the "at rest" position, roller bearing 58A rests against shaft 118 and is spaced from the surface 60 of ramped slot 52A and restrained in the "at rest" position by resilient spring 62. Upon rotation of shaft 118 as indicated at 51 with hub 242 stationary, the clutch housing 50A affixed to the hub remains temporarily stationary with the resiliently restrained roller 58A moving a short interval relative to the shaft 118. The roller 58A slides along the peripheral surface of shaft 118 until the surface 60 of ramped slot (as shown with ramped slot 52A′) contacts and bears against the roller (as shown with roller 58A′), to thereby wedge the roller between the shaft 118 and the clutch housing 50A. In this manner, the shaft 118 is engaged to the clutch housing 50A and causes the clutch housing 50A and hence the hub 242 and blade 16 to rotate. In the event that the speed of rotation of the shaft 118 decreases, or reverses, with respect to the housing 50A the housing 50A will continue to rotate independently of shaft 118, and housing 50A will overrun the shaft 118. In this overrun or freewheeling mode of operation, the rollers advance slightly to the position indicated at 58A″ (or 58A), with the resiliently restrained bearing 58A″ spaced from the surface 60 of ramped slot 52A and thus disengaged.

Clutch and roller assemblies of the aforedescribed types are commercially available, for example, from the Torrington Company of Torrington, Conn. as part Nos. RCB121616 and RCB081214.

With reference again to FIGS. 1-4, a force applied to handle 200, in the forward direction indicated at 210, causes rotation of drive wheels 30, 32 as indicated at 220 due to frictional force between the peripheral surface of wheels 30, 32 and the horizontal surface, e.g., a lawn, indicated at 230. Upon rotation of drive wheels 30, 32 in the forward direction 220, the coupled clutch and roller assemblies 40, 140 also rotate and engage the stationary rear axle 18. The rotating axle 18 is linked to the gear mechanism 25 which is used to turn the blade 16.

In particular, the gear mechanism includes a bevel gear set 241, comprising engaged bevel gears 244, 247, (bevel gear 247 fixedly coupled to axle 18) which together translate, i.e., convert, the rotational motion 246 of horizontally disposed axle 18 to rotational motion 248 of vertically oriented pulley shaft 250 concentrically engaged to bevel gear 244. Pulley shaft 250 is held in its position by bracket 260 which is fixed at 262 to the horizontal support member 266 of frame 12. Horizontal support member 266 is in turn fixed at 268, 269 to support brackets 26, 28. The upper portion of pulley shaft 250 freely rotates in bushing 270 as indicated at 275, and is held in place by nut 271 and washer 273, although a retaining ring could be utilized in lieu thereof. A relatively large pulley 280 is fixed to and rotates with pulley shaft 250 to drive a second smaller pulley 282 to which it is engaged by endless belt 285. The endless belt 285 is preferably provided with inner grooves or protrusions 287 which mate with teeth 289 of pulley 280 and teeth 291 of pulley 282. An idler pulley 301 is adaptably mounted in a slot 303 of support member 266 to allow appropriate tensioning of endless belt 285. Pulley 282 is fixed to vertically disposed pulley shaft 308 which, when driven by belt 285, is freely rotatable in bushing 310 in support plate 266 and in the bushing 312 in support plate 267 which rests directly on frame 12. A spur gear 400 is fixed to pulley shaft 308 by clamping screw and pin 402 and the driver spur gear 400 rotates with pulley shaft 308 in the direction shown at 405. A smaller driven (spur) pinion gear 411 is engaged to the driver spur gear 400 and is fixedly mounted at 415 on a vertically disposed shaft 118 which is rotatably supported by flanged bushing 422 on support member 267 of frame 12. Shaft 118 has the hub 242 of rotary blade 16 rotatably engaged thereto at bearing 425 (bearing 425 being optional), and the clutch and roller bearing assembly 240 of FIG. 5b are fixed to the hub 242 by bolts 243. With the arrangement as described, the blade 16 and its hub 242 are free to rotate about vertical shaft 118 while the shaft 118 is not rotating. Upon rotation of shaft 118 in the cutting direction indicated at 440, the clutch and roller bearing assembly 240 which is fixed to the hub 242 and coupled to the shaft 118, also rotates, being engaged by the rotating shaft 118 as described above in connection with FIG. 5b.

The operation of the lawn mower embodiment of the invention involves the pushing of handle 200 in the forward horizontal direction 210 which causes drive wheels 30, 32, to rotate and clutch and roller bearing assemblies 40, 140 to engage horizontally disposed axle 18. The horizontally disposed axle 18 when rotating, rotates bevel gear 247 of set 241. Because bevel gear 247 is engaged with bevel gear 244, the rotation of axle 18 is converted to rotation of vertically disposed shaft 250. The rotation of shaft 250 rotates pulley 280 which drives belt 285 and rotates pulley 282 and its shaft 308. Rotation of shaft 308 causes rotation of spur gear 400 which is fixed to the vertically disposed shaft 308. Rotation of spur gear 400 in turn drives engaged pinion gear 411 and rotates vertically disposed shaft 420 affixed thereto. Rotation of shaft 420 causes engagement of clutch and roller bearing assembly 240 mounted on hub 242 of blade 16, and blade 16 rotates in the cutting direction 440. It will be appreciated that operation of the lawn mower is extremely quiet compared to the lawn mowers of the art, as only the bevel gears 16 and the spur gears are in actual contact with each other.

In the event of the removal or reversal of the force applied at handle 200, the drive wheels 30, 32 and the rotation of clutch housing 50 slow down or reverse direction, and axle 18 is released by clutch and roller assemblies 40, 140 and continues to rotate independently; i.e., overrunning or freewheeling in the same direction together with pulleys 280, 282, gears 400, 411, shaft 420 and blade 16. The blade 16 continues to turn, however, first due of the inertia of the freewheeling components described above (until frictional forces reduce the rotational speed of shaft 118, resulting in the disengagement of shaft 118 from clutch and roller assembly 240 engaged to hub 242) and then due to the inertia of the blade itself. Upon resumption of force applied to handle 200 in the forward direction 210, coupling of the axle 18 and the blade 16 is reestablished via gear mechanism 25.

In instances of turning the lawn mower left or right, one drive wheel is caused to rotate slower than the other. In this circumstance, the clutch and roller assembly of the slower wheel releases from axle 18 and the lawn mower continues its operation. Skidding is avoided due to the "differential" type effect caused by the free-wheeling of the slower wheel.

The blade member 16 shown in FIGS. 1-4 is roughly similar to a common rotary type mower blade, and is preferably configured as illustrated in FIGS. 6a-6c. More particularly, the blade member 1000 shown in FIGS. 6a-6c is half of a symmetrical rotary blade and is suitably formed of metal and/or plastic composites. Blade member 1000 tapers in width as it extends towards its radially outward edge 1002. Attached to the end of blade member 1000 is a replaceable cutter or razor 1004 having threaded posts or snap fit fasteners 1006, 1008 which pass through holes 1010, 1012 of blade 1000. Lock nuts 1014, 1016 firmly hold cutter 1004 on blade 1000 with its sharpened razor edge 1005 extending in a radial direction. The razor cutter 1004 can be readily removed and replaced or resharpened and replaced without disengaging the blade 1000 from the lawn mower.

While blades such as bade 1000 are suitable for the lawn mower 10 of the invention, in accord with another preferred aspect of the invention, the provided blade is an inertial type blade assembly. A first inertial type blade assembly is shown in FIGS. 7a-7d as blade assembly 1100. Blade assembly 1100 comprises a radial arm 1101 and a separate blade carrying element 1103 which holds a replaceable cutter or razor 1004 having sharp edge 1005 as hereinabove described. As seen in FIGS. 7a and 7b, the blade carrying element 1103 is slidably engaged to radial arm 1101 at radial slot 1136 by shoulder screws 1138, 1140 which pass through slot 1136 and holes 1132, 1134 of blade carrying element 1103. With blade 1100 at rest, the blade carrying element is held in the phantom position 1103' shown in FIG. 7b by the resilient spring 1115 or other resilient material which is engaged to blade hub 1190 at 1117 and to blade carrying element 1103 at 1138. Upon rotation of blade hub 1190, the centrifugal force developed causes blade carrying element 1103 to move in slot 1136 from its radially inward (phantom) position adjacent hub 1190 to the fully extended radially outward position of FIG. 7a. The fact that blade assembly 1100 in its "at rest" (phantom) position will have its mass closer to hub 1190 enables rapid acceleration of the blade assembly 1100 to cutting speed. As the blade assembly 1100 is accelerated, some of the applied force is used to increase the inertia of the blade as the blade carrying element 1103 and blade 1004 moves away from the hub 1190. The increased inertia of the fully extended blade assembly 1100 provides a flywheel effect when the blade is freewheeling or overrunning as hereinabove described.

A second inertial blade assembly 1200 in accord with the present invention is shown in FIGS. 8a-8d wherein a separate blade carrying element 1203 which holds blade 1004 is pivotally engaged at pin 1245 to radial arm 1201. The blade carrying element 1203 is preferably sized large enough to carry blade 1004, and includes holes 1010 and 1012 which accommodate snap pins 1006 and 1008 for mating with the blade 1004, as well as an additional hole 1255 through which pin 1245 extends for rotational engagement with radial arm 1201. Radial arm 1201 also includes a hole 1256 for receiving pin 1245 and mating with the blade carrying element 1203, while blade 1004 may also include a similar in-line hole or notch (not shown) if blade 1004 would otherwise interfere with pin 1245. Also engaged at pin 1245 is a resilient torsion spring 1215 which has a first end engaged to the blade carrier element 1203 by snap pin 1006, and a second end engaged to the radial arm 1201 at 1259 by any suitable means (not shown) or by passing that end through the arm. The resilient spring 1215 holds the blade carrying element 1203 in the phantom position 1203' of FIG. 8b when the blade assembly 1200 is "at rest" (i.e., not moving or moving slowly). Upon rotation of blade assembly 1200, the centrifugal force developed causes the blade carrying element 1203 to swing about pivot pin 1245 from its partially rotated "phantom" position which is situated with blade carrying element 1203 and razor 1005 at ninety degrees relative to radial arm 1201, to the fully extended radially outward position of FIG. 8a where blade carrying element 1203 is in line with radial arm 1201 and cutting is accomplished. The lower inertia of blade assembly 1200 in its "at rest" (phantom) position enables rapid acceleration to cutting speed and the increased inertia of the fully extended blade assembly provides a flywheel effect when the blade is freewheeling or overrunning as hereinabove described. Also, the ability of blade carrying element 1203 to pivot around pin 1245 provides a safety feature, where upon when the razor 1005 contacts a rigid element (e.g., rock, shoe, etc.), rather than attempting to cut through the rigid element, the blade carrying element 1203 will tend to rotate about pin 1245 and avoid or minimize damage.

Figure 9A:
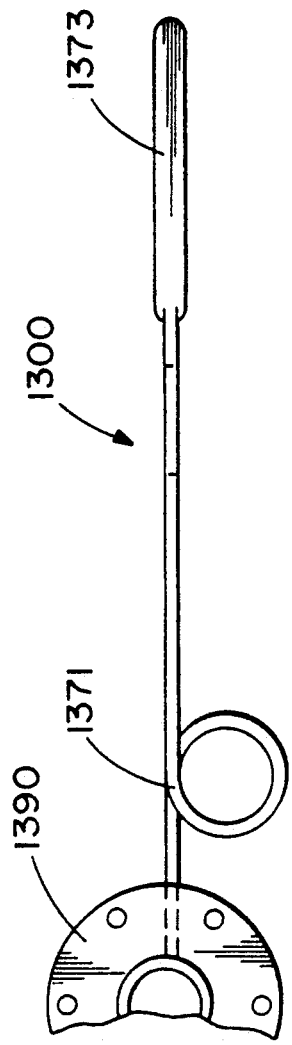
FIGS. 9a and 9b are respectively a top plan view and a side elevational view of a safety rod blade for the lawn mower of FIG. 1.
Figure 9B:
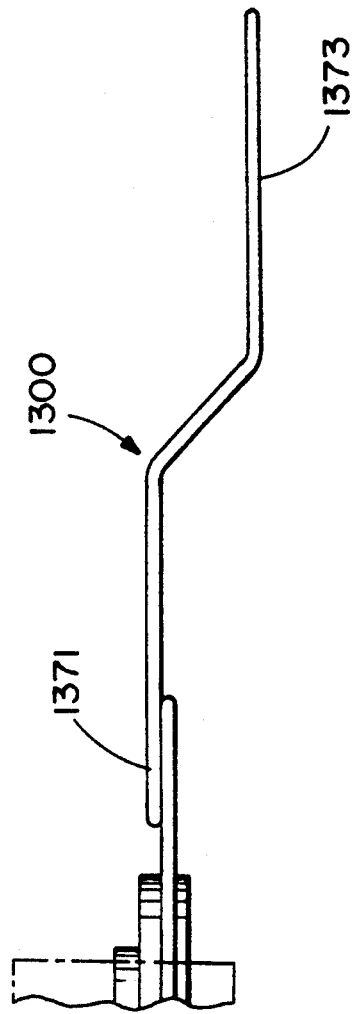

Turning to FIGS. 9a and 9b, a sharpened rod blade "assembly" 1300 useful with the lawn mower of the invention is seen. Sharpened rod blade "assembly" 1300 is preferably comprised of spring steel and is basically a single piece of steel which is provided with a coil loop 1371 relatively near the hub 1390, and which is flattened and sharpened into a blade end 1373. The coil loop 1371, which if desired could include more than one loop, acts as a spring to absorb shock when the blade end 1373 hits a hard object.

Figure 10A:
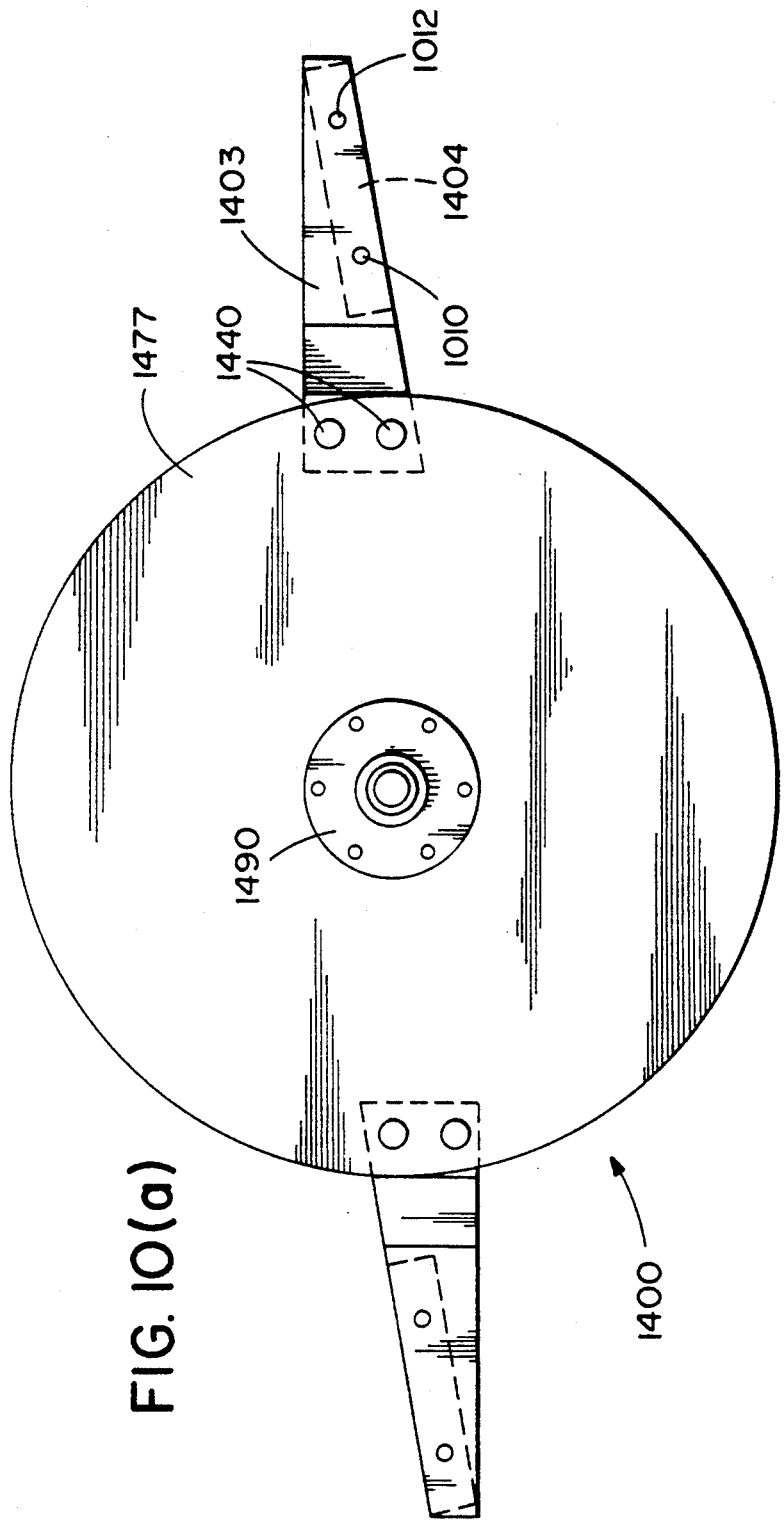
FIGS. 10a and 10b are respectively a top plan view and a side elevational view of a flywheel blade for the lawn mower of FIG. 1.
Figure 10B:
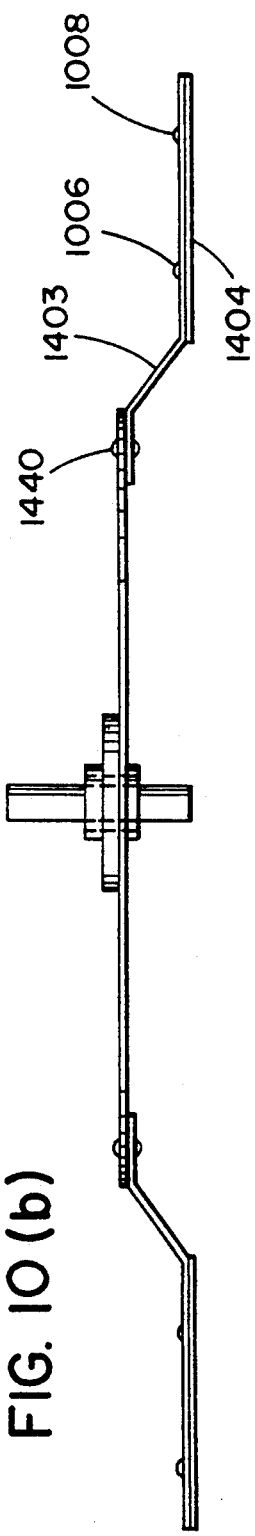

A flywheel blade assembly 1400 which can be used in conjunction with the lawn mower of the invention is seen in FIGS. 10a and 10b. The flywheel blade assembly 1400 is comprised of a flywheel mass 1477 which is preferably formed as a disc which is coupled to hub 1490, blade carriers 1403, and blades 1404. Each blade carrier 103 is coupled to the flywheel mass by rivets or pins 1440, and the blade carrier extends downward and outward therefrom. As with the arrangements of blade assemblies 1100 and 1200, the blade 1404 of blade assembly 1400 is coupled to the blade carrier 1403 by threaded posts or snap fit fasteners 1006 and 1008 which extend through holes 1010 and 1012 of the blade carrier 1403.

Figure 11A:
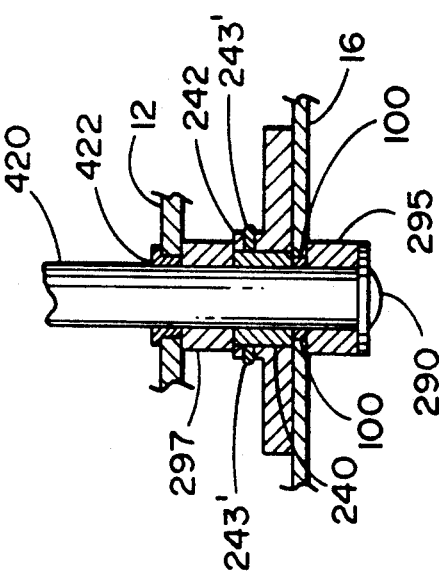
FIG. 11a is a cross-sectional view of a blade spacer placement element for the blade of the lawn mower of FIG. 1 in conjunction with the shaft and spacer element retaining means.
Figure 11B:
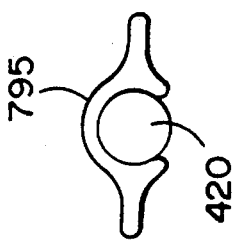
FIG. 11b is a top plan view of a snap-on spacer element useful for blade height adjustment.

In accord with yet another particularly advantageous aspect of the present invention, because of the design of the lawn mower which utilizes a clutch and roller bearing assembly where the blade is not directly connected to the blade rotation shaft, the height of the cutting blade is readily adjustable in response to various lawn and turf conditions. In particular, and with reference to FIG. 11a, cutting blade 16 (shown in FIG. 3) is secured to hub 242 at 100 and hub 242 surrounds and is affixed at 243 to clutch and roller assembly 240. A retaining bolt 290 threadably engages shaft 420 and retains removable spacer piece(s) 295 in place below blade 16 and removable spacer 297 in place above hub 242. By simply removing spacers 295, 297 and either changing their positions (e.g., with two on top or two on bottom) or substituting different sized spacers, the blade 16 can be easily adjusted in the height range indicated at 298. Alternatively, any number of a plurality of small sized spacers (not shown) can be stacked together to place the blade 16 at a desired height. If desired, semi-flexible plastic molded spacers 795 such as seen in FIG. 11b can be utilized. Spacers 795 are properly sized so that they can be snap fit onto the shaft 420.

In a preferred embodiment of the above-described lawn mower, the following materials and specifications apply:

wheels: Nylon 12" diameter wheels with pneumatic rubber tires push handle: tubular aluminum or glass reinforced plastic with rubber hand grips
blade: light metal and/or plastic composite
frame: monocoque construction shroud—fiber reinforced plastic and aluminum with pick-up points for axle stubs, transmission, main rotor shaft, axle carriers, and push handle.

Figure 12:
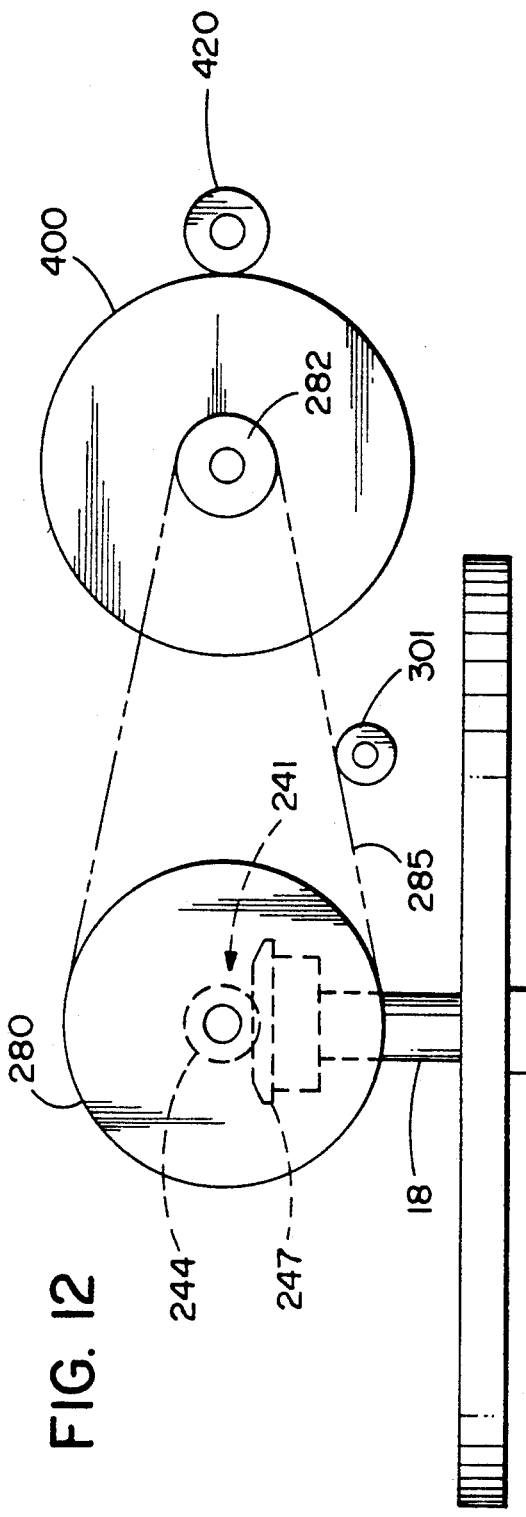
FIG. 12 is a schematic representation of the drive mechanism of the invention showing the gear relationships thereof.

The drive diagram of FIG. 12 shows the preferred mechanical relationships for the above-described lawn mower. As shown, bevel gear 247 has a 2:1 ratio with bevel gear 244 (i.e., one rotation of axle 18 which causes bevel gear 247 to rotate once causes bevel gear 244 to rotate twice); large pulley 280 has a 3:1 ratio with small pulley 282; and spur gear 400 has a 4:5 turn ratio with (spur) pinion gear 420. Thus, the overall ratio obtained by the gear mechanism 25 is a 27.5:1 ratio such that one rotation of axle 18 causes twenty-seven and a half rotations of blade 16.

Figure 13A:
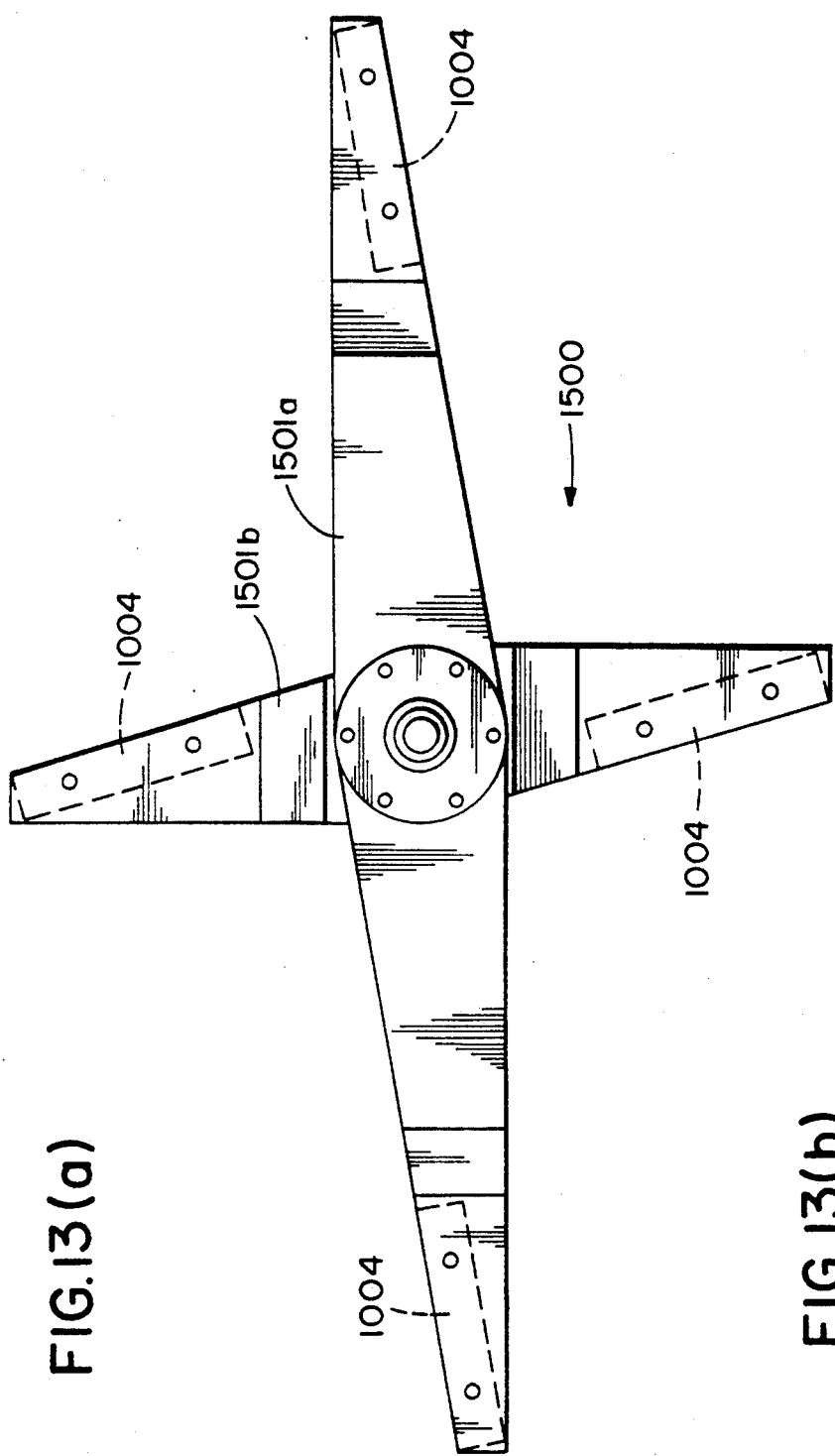
FIGS. 13a and 13b are respectively a top plan view and a side elevational view of a mulching blade attachment to the drive mechanism of FIG. 3.
Figure 13B:
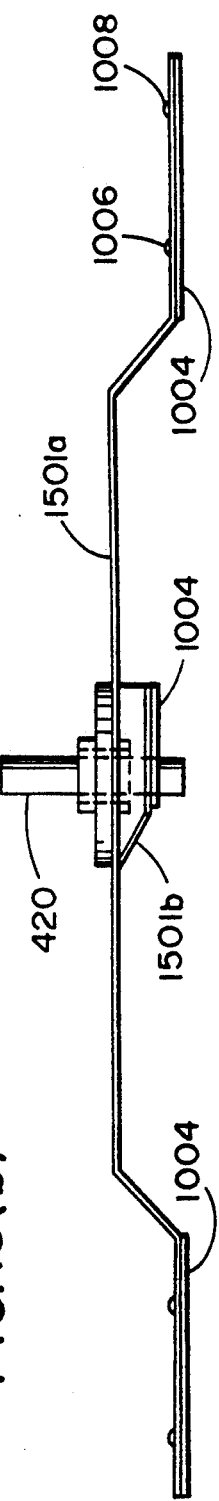
Figure 14A:
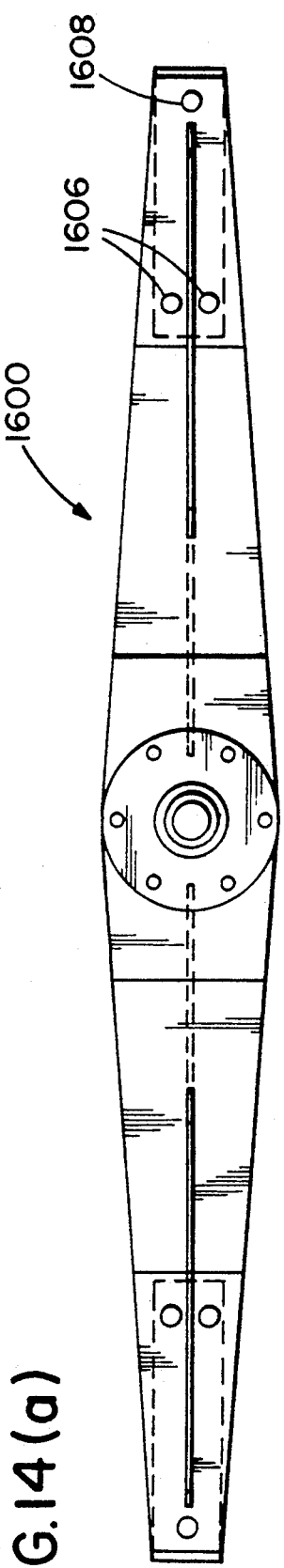
FIGS. 14a and 14b are respectively a top plan view and a side elevational view of a brush attachment to the drive mechanism of FIG. 3.
Figure 14B:
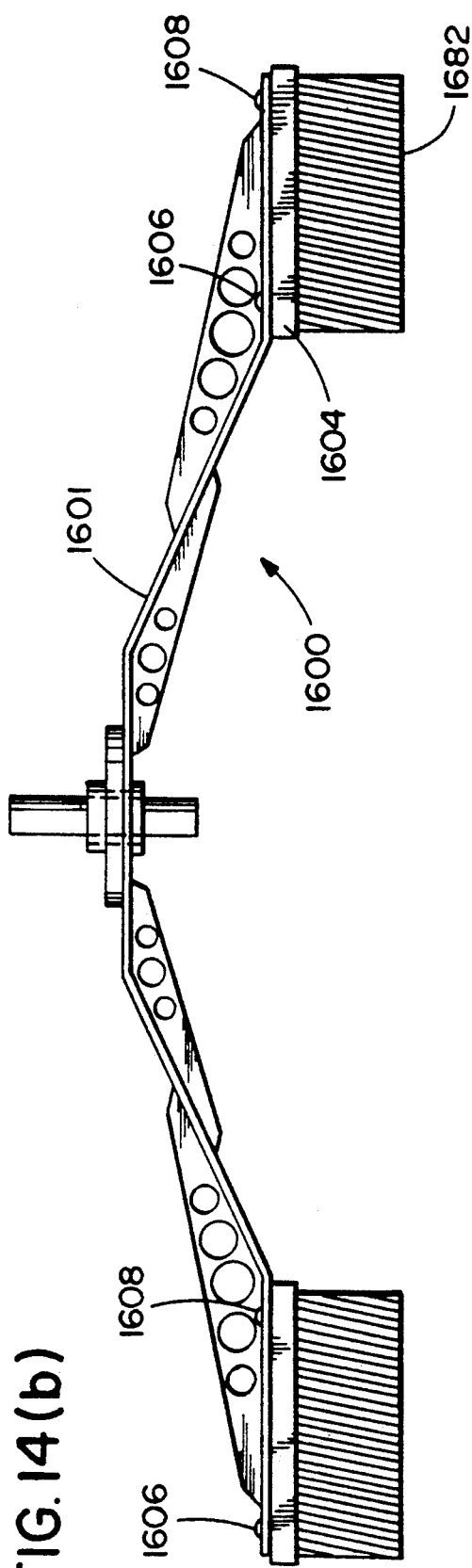

In accord with yet another aspect of the invention, because of the modularity of the lawn mower design, the mower blade 16 of the above-described device can be replaced by other devices such as a mulching blade mechanism 1500 as shown in FIGS. 13a and 13b, a rotating brush mechanism 1600 as shown in FIGS. 14a and 14b, and a rotating thatching blade mechanism 1700 as shown in FIGS. 15a and 15b. The mulching blade mechanism 1500 is preferably comprised of two sets of blade members, with a first blade member 1501a similar to blade mechanism 1000 discussed above with reference to FIGS. 6a–6c, and a second blade member 1501b which is also similar to blade mechanism 1000. Blade member 1501b, however, is disposed at a ninety degree angle relative to the first blade member (as seen in FIG. 15a), is shorter than blade member 1501a (as seen in FIG. 15a) and is preferably higher relative to the ground (as seen in FIG. 15b). Blade member 1501b thus acts to recut grass clippings as they are circulated in the turbulence of the mower deck. Each of the blade members includes two blades 1004 which are attached to the blade members by threaded posts or snap fit fasteners 1006, 1008. Preferably, blade members 1501a and 1501b are coupled together and move together around shaft 420.

The rotating brush arrangement of FIGS. 14a and 14b shows a rotating brush mechanism 1600 which has outwardly extending arms 1601. The outwardly extending arms terminate with a brush carrier 1604 from which brush bristles 1682 extend downwardly. Brush carrier 1604 is attached to the arm 1601 by threaded posts or snap fit fasteners 1606, 1608. While three fasteners 1606, 1608 are shown for each brush, it will be appreciated that different numbers of fasteners can be used as desired. As seen in FIG. 14b, extending arms 1601 are considerably thicker than the arms of FIGS. 7, 8, 9, etc. to which blades are attached, as the brushes 1682 exert considerable drag and hence torque on the arms, and the arms must be strong enough to handle the torque. Preferably, the driving mechanism for the rotating brush mechanism can be provided with a lower mechanical gain ratio than that provided for the mower blades so that the brushes do not spin as fast as blades spin. The lower gain ratio may be obtained by replacing one or more of the gears, or by providing additional gears onto which, e.g., the belt 285 can slide. Thus, for example, one or both of gears 280 and 282 can be provided with gears (not shown) which are located directly above or below them, and the belt can be moved up or down either manually or mechanically by a lever (much as a gear change in a bicycle is accomplished) which is coupled to a cable (not shown), which in turn is coupled to a gear changing switch (not shown).

The rotating brush mechanism 1600 of FIGS. 14a and 14b has particular application to sweeping situations as well as to puddle dispersing applications such as for dispersing tennis court puddles. The quickly rotating brushes can disperse the puddles not only by throwing the water, but, because of the high speeds obtainable, some of the water can actually be advantageously vaporized. Also, instead of using brushes as shown in FIGS. 14a and 14b, squeegees or other water dispersing attachments can be utilized.

Turning to FIGS. 15a and 15b, the shown rotating thatching blade mechanism 1700 is essentially identical to the brushes 1600 of FIGS. 14a and 14b, except that instead of brush bristles 1682, thatching rods 1783 are provided and extend from rod carriers 1704. The rod carrier is attached to the arm 1701 of the rotating thatching blade mechanism by threaded posts or snap fit fasteners 1706 and 1708. If desired, thatching rods 1783 may be provided with spring loops such as disclosed with reference to FIG. 9b to provide more give to the rotating thatching blade mechanism 1700. In addition, as discussed above with reference to the rotating brush mechanism of FIGS. 14a and 14b, it is desirable for the thatching blade mechanism 1700 to turn more slowly than the typical mower blade mechanism previously described. Thus, a different gear gain ratio may be provided for the preferred thatcher of the invention either by replacing gears or by providing additional gears and a switching mechanism.

Figure 16A:
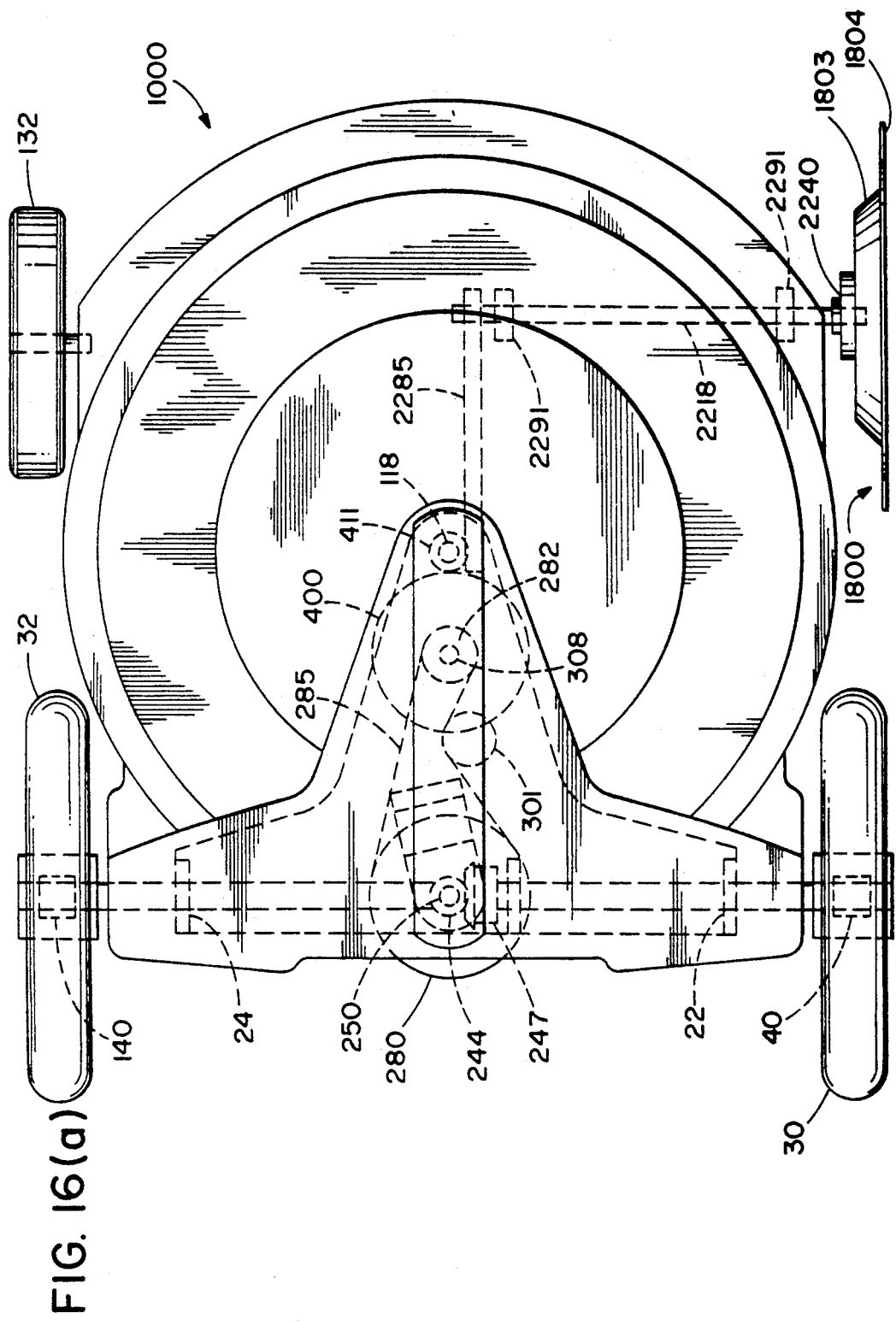
FIGS. 16a and 16b are respectively a top plan view and a side elevational view of an edger attachment in conjunction with a modified drive mechanism of the invention.
Figure 16B:
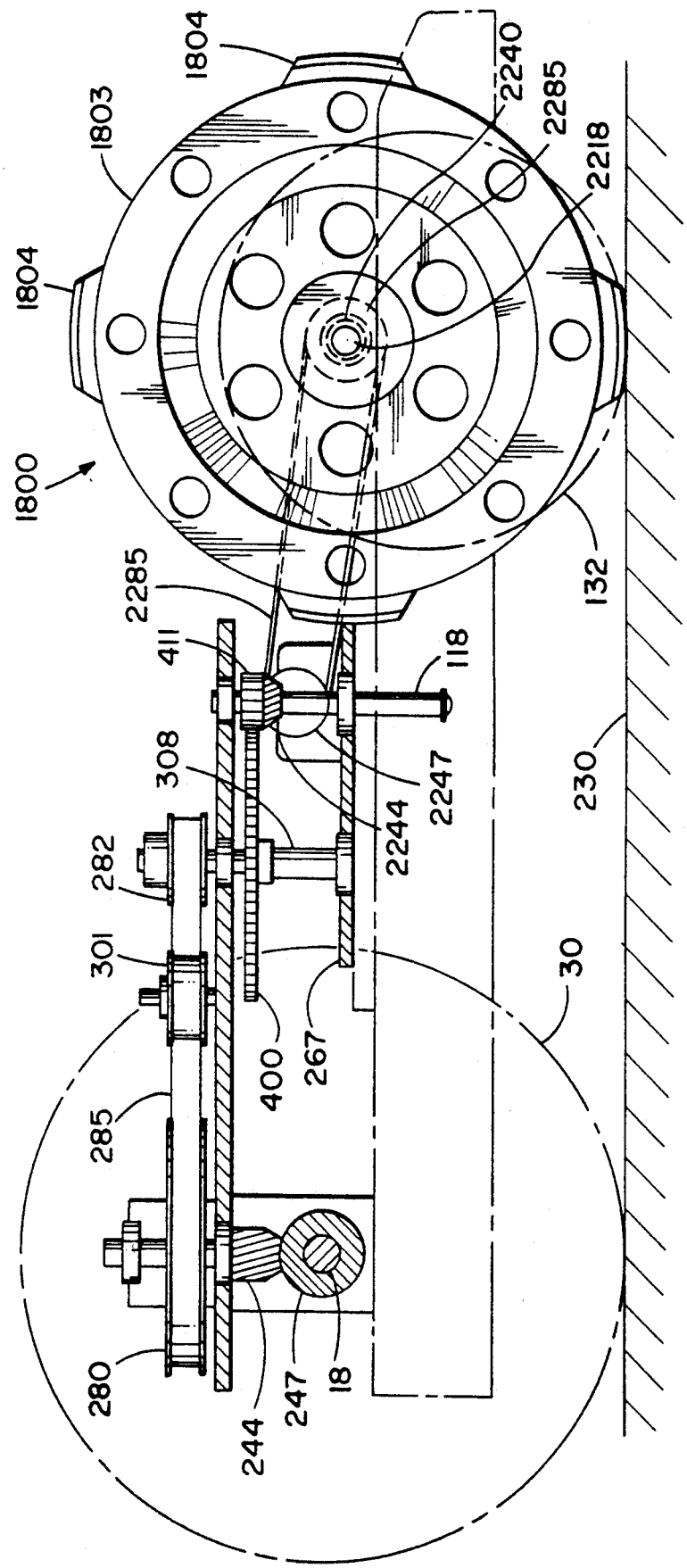
Figure 17A:
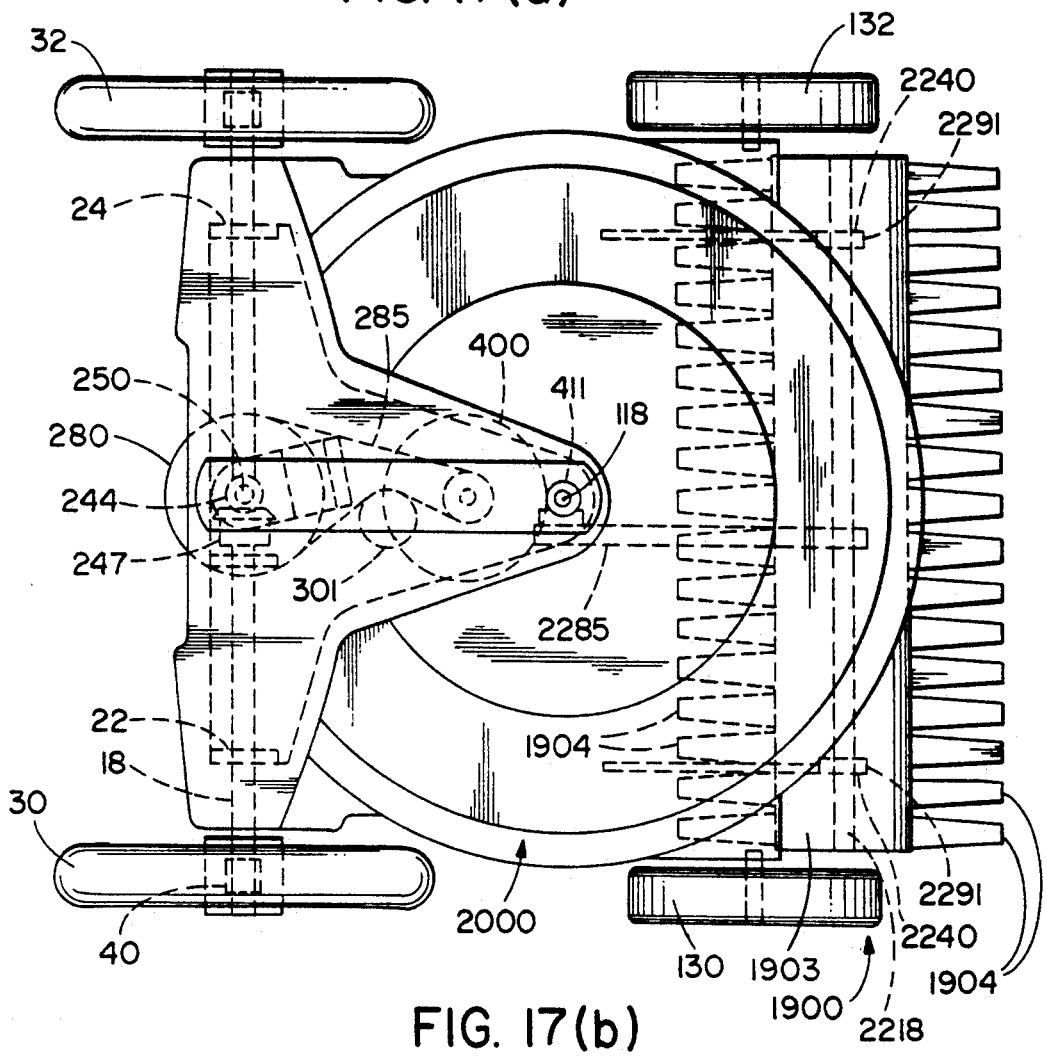
FIGS. 17a and 17b are respectively a top plan view and a side elevational view of a leaf sweeper attachment in conjunction with a modified drive mechanism of the invention.
Figure 17B:
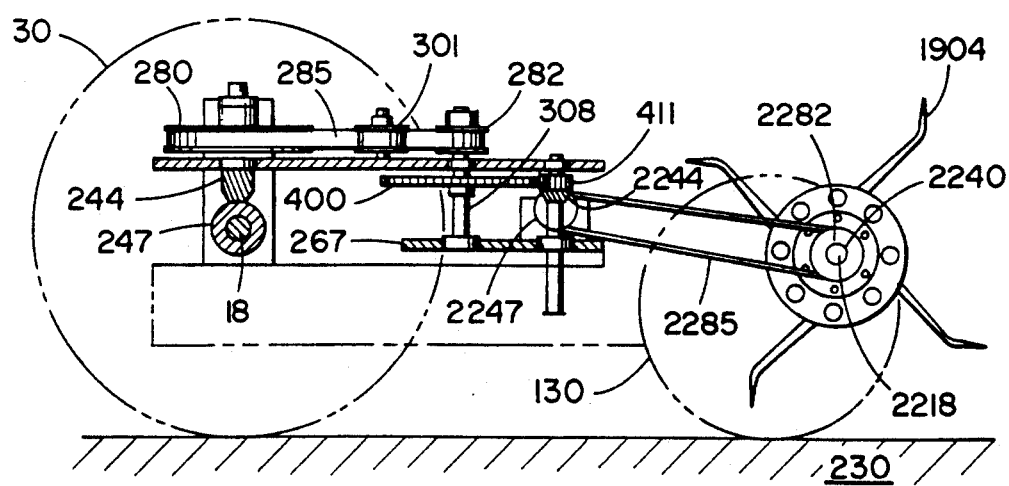

While the mower blades, and rotating brushes and thatchers provide mechanisms which rotate in a plane parallel to the ground, with the provision of two or three additional gears, attachments are provided which rotate in a plane perpendicular to the ground. In particular, an edger 1000 with an edger attachment 1800 with an edger blade 1804 is seen in FIGS. 16a and 16b, while a leaf picker 2000 with a leaf picker attachment 1900 having a roller brush 1904 is seen in FIGS. 17a and 17b. The edger 1000 of the invention basically includes the same gears and mechanisms of the lawn mower 10 described with reference to FIGS. 1–4, and the same parts are shown with the same numbers in FIGS. 16a and 16b. The primary difference between the lawn mower mechanism and the edger mechanism is that another bevel gear mechanism with bevel gears 2244 and 2247 are provided on axle 118 in conjunction with belt 2285 and gear 2282 to translate the rotation of vertical axle 118 to the rotation of axle 2218. Axle 2218, which is horizontally disposed, is connected to axle 2218 and is supported at supports 2291. Otherwise, the axle arrangement with the roller clutch bearing 2240, etc., is essentially identical to the arrangement of axle 18 discussed above with reference to FIGS. 1–4 and 5b. Thus, after movement of wheels 30, 32 of the edger 1000 has stopped, the edger blade mechanism 1800 will continue to rotate.

The edger blade mechanism 1800 seen in FIGS. 16a and 16b generally includes a blade carrier disc 1803, to which four tapered blade members 1804 are attached in any manner desired. Of course, if desired, the blade members 1804 may be integral with disc 1803.

The leaf picker or lawn sweeper 2000 of FIGS. 17a and 17b is very similar to the edger 1000 of FIGS. 16a and 16b in that rotation of the picker mechanism 1900 is in a plane perpendicular to the ground 230. Thus, bevel gears 2244 and 2247 are provided to translate rotation from the vertical axis of axle 118 to a horizontal axis, while belt 2285 and and gear 2282 are provided in conjunction with the bevel gears to translate the rotation to the axle 2218 of leaf picker mechanism 1900. Roller clutch bearings 2240 are provided on the axle 2218 to couple the axle to the "blade" carrier 1903 from which the leaf picker blades 1904 extend. It Will be appreciated that supports 2291 must also be provided for the axle 2218 and roller clutch bearings 2240.

If desired, the lawn mower mechanism of the invention which permits effective mowing and other functions via manual power can be provided with one or more additional components such as a baby seat, an exercise resistance adjustment, a portable radio/cassette holder, a water bottle holder, a tool holder, an umbrella, a pulse/energy monitor, etc.

Figure 3:
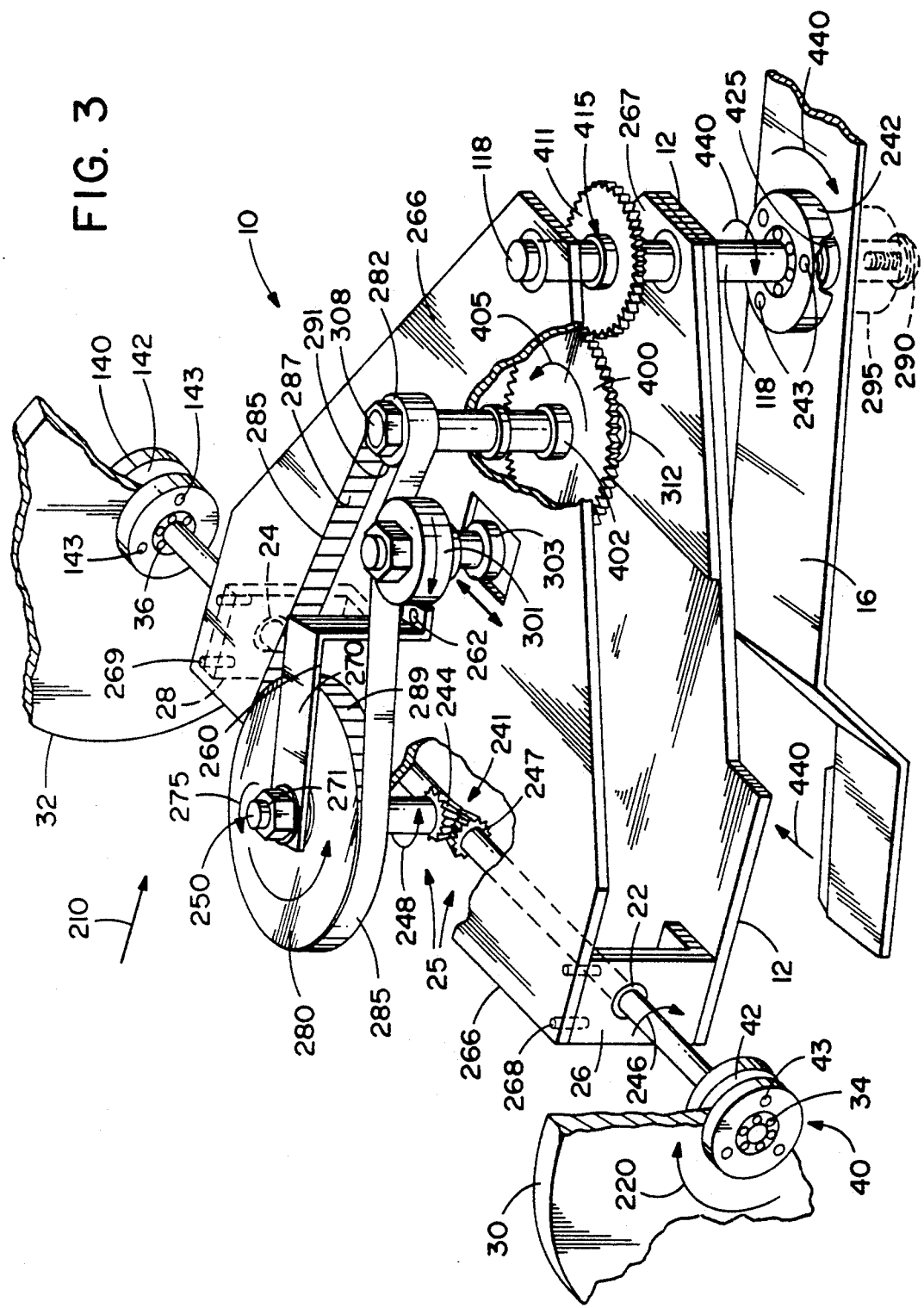
FIG. 3 is a perspective view of the drive mechanism and frame of the lawn mower of FIG. 1.
Figure 4:
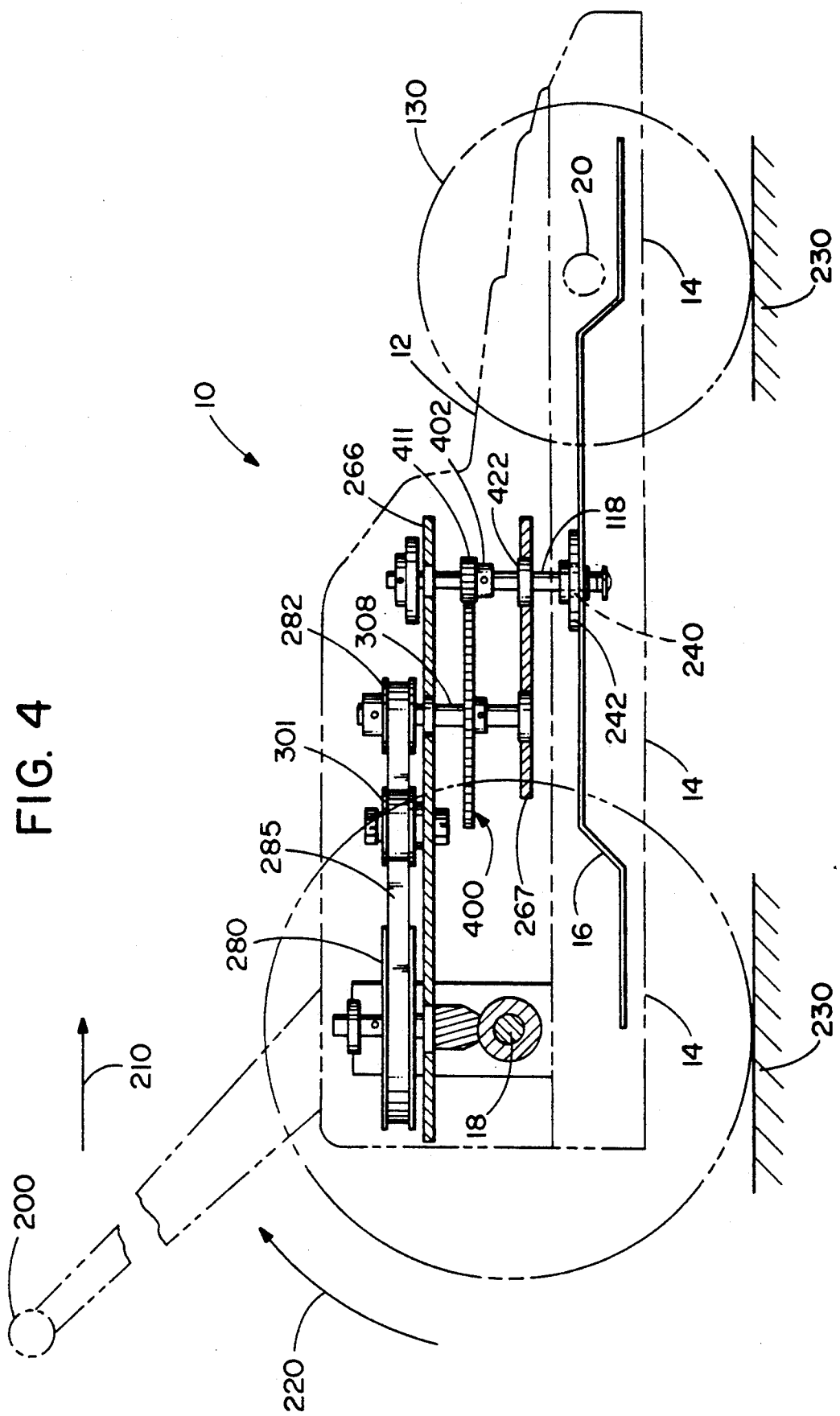
FIG. 4 is a side elevational view of the drive mechanism and frame of the lawn mower of FIG. 1.

Turning to FIGS. 18a-1 through 18a-3, a first preferred blade cartridge of the invention is seen. The cartridge includes a blade 4004a having sharp edge 4005, and elastomeric blade carrier 4004b, and two snap fit pins 4006 and 4008. A second preferred blade cartridge seen in FIGS. 18b-1 through 18b-3 is made totally of plastic or metal and includes blade 4004 with sharp edge 4005, and snap fit pins 4006 and 4008. As seen in FIG. 18c, the blade cartridges can be snapped into holes 4010 and 4012 of arm 4001 which extends from a hub (not shown). It will be appreciated that if desired, the pins 4006 and 4008 can be provided on the arm 4001 instead of on the cartridge blade. Other quick release blade cartridge mechanisms will suggest themselves to those skilled in the art.

There have been illustrated and described herein manual lawn mowers. While particular embodiments of the invention have been described, it is not intended that the invention be limited thereto, as it is intended that the invention be as broad in scope as the art will allow and that the specification be read likewise. Thus, while particular gear mechanisms for translating the force and stepping up rotation were disclosed, it will be appreciated that other mechanisms could be utilized. For example, instead of a timing belt, an ordinary belt, a chain drive, or directly meshing gears could be utilized. Also, while particular clutch and roller bearing mechanisms were described, it will be appreciated that other clutch and roller bearing mechanisms could be utilized. Further, while particular materials, sizes, and shapes were described as preferred for the frame, gears, etc., it will be appreciated that other materials can be utilized, and different sized and shaped frames and different sized gears could be utilized. Likewise, while particular inertial blade arrangements were described as being preferred, it will be appreciated that other inertial blade arrangements could be utilized. For example, instead of using a slot in the arm with the blade having shoulder screws extending therethrough, the sliding portion of the blade can be fabricated of formed metal which could fit over and slide along the arm, or which could fit in and slide along a track extending from the arm. Also, while described, it will be appreciated that the provided mechanism of the invention permits other modular components to be attached for accomplishing other functions. It will therefore be appreciated by those skilled in the art that yet other modifications could be made to the provided invention without deviating from its spirit and scope as so claimed.

I claim:

1. A lawn mower comprising:
   (a) a frame;
   (b) at least one horizontally disposed axle means rotatably coupled to said frame;

(c) first and second spaced apart, opposed, drive wheels, each rotatably engaged to said axle means;

(d) first clutch and roller means coupling said first drive wheel to said axle means such that rotation of the first drive wheel in a forward direction at a speed faster than the speed of the axle means causes said axle means to be engaged with said first drive wheel and rotate therewith until the speed of the first drive wheel decreases or reverses relative to the speed of the axle, in which event the axle means disengages from said first drive wheel and continues to rotate without change of direction independently of said first drive wheel;

(e) second clutch and roller means coupling said second drive wheel to said axle means such that rotation of the second drive wheel in a forward direction at a speed faster than the speed of the axle means causes said axle means to be engaged with said second drive wheel and rotate therewith until the speed of the second drive wheel decreases or reverses relative to the speed of the axle, in which event the axle means disengages from said second drive wheel and continues to rotate without change of direction independently of said second drive wheel;

(f) mechanical linkage means engaged to said horizontal axle means including at least one vertically disposed element for converting rotational motion of said horizontal axle means to rotational motion of said vertically disposed element;

(g) blade means rotatably coupled to said vertically disposed element for rotation about the vertical axis of said vertically disposed element;

(h) third clutch and roller means coupling said at least one vertically disposed element of the mechanical linkage means to said blade means such that rotation of the vertically disposed element in a predetermined rotational direction at a speed faster than the speed of the blade means causes said blade means to be engaged with said vertically disposed element and rotate therewith until the speed of the vertically disposed element of the mechanical linkage means decreases, or reverses, relative to the speed of the blade means in which event the blade means disengages from the vertically disposed element and continues to rotate without change of direction independently of the vertically disposed element of the mechanical linkage means.

2. A lawn mower according to claim 1, wherein:
said mechanical linkage means includes a bevel gear drive, and a first pulley, said first pulley having a vertical shaft coupled to said horizontal axle means by said bevel gear drive, whereby rotation of said horizontally disposed axle means is converted to rotational motion of said vertical shaft around an axis perpendicular to the axis of said horizontal axle means.

3. A lawn mower according to claim 2, wherein:
said mechanical linkage means includes a second pulley of substantially smaller size than said first pulley and having a vertical shaft, said vertical shaft being coupled to said frame and free to rotate around the vertical axis of said vertical shaft, and said mechanical linkage means further includes a flexible endless belt means engaging said first pulley and said second pulley whereby said first pulley functions as a drive pulley for said second pulley.

4. A lawn mower according to claim 3, wherein:
said first pulley and said second pulley are provided with peripheral engaging surfaces and said endless belt is provided with mating means for engagement with the peripheral engagement surfaces of the first and second pulleys.

5. A lawn mower according to claim 3, wherein:
said mechanical linkage means further includes a driver gear engaged to said vertical shaft of said second pulley, and a driven gear substantially smaller than said driver gear and engaged with said driver gear and having a vertical shaft which is rotatably coupled to said frame.

6. A lawn mower according to claim 5, wherein:
said blade means is engaged to said vertical shaft of said driven gear for rotation therewith.

7. A lawn mower according to claim 6, further comprising:
blade position adjustment means coupled to said vertical shape of said driven gear for adjusting the vertical position of said blade means.

8. A lawn mower according to claim 1, wherein:
said vertically disposed element comprises a vertical axle, and
said blade means comprises
a hub coupled by said third clutch and roller means to said vertical axle,
at least one arm member extending outward from said hub and having a distal end,
a cutting element having a sharpened edge movably engaged to said arm member at an outwardly extending portion of said arm member,
resilient means for urging said cutting element into a first position relative to said hub when said arm member is at rest or rotating at less than a predetermined speed, wherein when said cutting element is at a speed greater than said predetermined speed said cutting element extends radially outward beyond the distal end of said arm member.

9. A lawn mower according to claim 8 wherein:
said resilient means is coupled to said hub and to said cutting element.

10. A lawn mower according to claim 9, wherein:
said arm member has a slot extending in a direction parallel to a long axis of said arm member, and said cutting element includes engagement means which are slidably engaged in said longitudinal slot in said arm member.

11. A lawn mower according to claim 8, wherein:
said resilient means is coupled to said arm member and to said cutting element, and said cutting element is pivotally engaged to said arm member.

12. A lawn mower according to claim 11, wherein said resilient means comprises a torsion spring permitting rotation of said cutting element relative to said arm member.

13. A lawn mower according to claim 1, wherein said blade means comprises a hub coupled to said vertically disposed element by said third clutch and roller means, and a wire blade coupled to said hub, said wire blade having a first horizontally extending portion extending from said hub at a first horizontal level, a second portion extending from said first horizontal level to a second horizontal level below said first horizontal level, and a third horizontally extending portion extending from said second portion parallel said first horizontally extending portion, said third horizontally extending portion having a substantially flattened portion with a sharpened edge.

14. A lawn mower according to claim 13, wherein:
at least one of said first, second, and third portions of said wire blade has a loop extending in a plane substantially parallel the ground.

15. A manual powered tool, comprising:
a) a pair of relatively large diameter drive wheels;
b) a horizontally disposed axle on which said drive wheels are spaced apart;
c) two clutch and roller bearing means on said horizontal axle, each clutch and roller bearing means coupling one of said drive wheels to said horizontal axle;
d) a gear mechanism having a translation gear means and a driving step-up gear means coupled to said translation gear means including a first driving gear of larger diameter and a second driving gear of smaller diameter coupled to said first driving gear, said translation gear means being coupled to said horizontal axle for translating rotation of said horizontal axle to rotation of said step-up gear mans around a vertical axis;
e) a vertical axle coupled to said second driving gear of smaller diameter;
f) a rotary type tool implement coupled to said second driving gear of smaller diameter; and
g) a third clutch and roller bearing means for coupling said rotary type tool implement to said vertical axle.

16. A manual powered tool according to claim 15, wherein:
said gear mechanism further comprises a belt coupling said first driving gear of larger diameter and said second driving gear of smaller diameter.

17. A manual powered tool according to claim 16, wherein:
said gear mechanism further comprises a third and a fourth driving gear, said third driving gear being of relatively larger diameter than said fourth driving gear, said third and fourth driving gears being coupled together, and said fourth driving gear being connected to said vertical axle and thereby coupling via said third driving gear said second driving gear to said vertical axle.

18. A manual powered tool according to claim 15, wherein:
said rotary type tool implement comprises one of a blade means, a mulching blade means, a sweeper means, and a thatcher means.

19. A manual powered tool according to claim 18, wherein:
said rotary type tool implement comprises a hub, an arm extending from said hub, and a blade, or brush, or a plurality of wires coupled to said arm, said hub being coupled to said Vertical axle by said third clutch and roller bearing means.

20. A manual powered tool according to claim 18, further comprising:
rotary type tool implement position adjustment means coupled to said vertical axle for adjusting the vertical position of said rotary type tool implement.

21. A manual powered tool according to claim 18, wherein:
said rotary type tool implement comprises an inertial blade means having a hub coupled by said third clutch and roller means to said vertical axle,
at least one arm member extending outward from said hub and having a distal end,
a cutting element having a sharpened edge movably engaged to said arm member at an outwardly extending portion of said arm member,
resilient means for urging said cutting element into a first position relative to said hub when said arm member is at rest or rotating at less than a predetermined speed, wherein when said cutting element is at a speed greater than said predetermined speed said cutting element extends radially outward beyond the distal end of said arm member.

22. A manual powered tool according to claim 21, wherein:
said resilient member is coupled to said hub and to said cutting element.

23. A manual powered tool according to claim 22, wherein:
said arm member has a slot extending in a direction parallel to a long axis of said arm member, and said cutting element includes engagement means which are slidably engaged in said longitudinal slot in said arm member.

24. A manual powered tool according to claim 21, wherein:
said resilient member is coupled to said arm member and to said cutting element, and said cutting element is pivotally engaged to said arm member.

25. A manual powered tool according to claim 24, wherein:
said resilient member comprises a torsion spring permitting rotation of said cutting element relative to said arm member.

26. A manual powered tool according to claim 15, wherein:
said rotary type tool implement comprises a blade means having a hub coupled to said vertical axle by said third clutch and roller means, and a wire blade coupled to said hub, said wire blade having a first horizontally extending portion extending from said hub at a first horizontal level, a second portion extending from said first horizontal level to a second horizontal level below said first horizontal level, and a third horizontally extending portion extending from said second portion parallel said first horizontally extending portion, said third horizontally extending portion having a substantially flattened portion with a sharpened edge.

27. A lawn mower according to claim 26, wherein:
at least one of said first, second, and third portions of said wire blade has a loop extending in a plane substantially parallel the ground.

28. A manual powered tool, comprising:
a) a pair of relatively large diameter drive wheels;
b) a first horizontally disposed axle on which said drive wheels are spaced apart;
c) two clutch and roller bearing means on said first horizontal axle, each clutch and roller bearing means coupling one of said drive wheels to said first horizontal axle;
d) a gear mechanism having a first translation gear means, a second translation gear means, a driving step-up gear means, a second driving gear means, a vertical axle, and a second horizontal axle, said driving step-up gear means coupled to said first translation gear means and to said second translation gear means and including a first driving gear of larger diameter and a second driving gear of smaller diameter coupled to said first driving gear and rotating about said vertical axle, said first translation gear means being coupled to said first horizontal axle for translating rotation of said first horizontal axle to rotation of said step-up gear means around the vertical axis of said vertical axle, and said second translation gear means being coupled to said vertical axle for translating rotation of said driving step-up gear means to rotation of said second driving gear means, and said second driving gear means coupled to and driving said second horizontal axle;

e) a tool implement coupled to and rotating about said second horizontal axle; and f) a third clutch and roller bearing means for coupling said tool implement to said second horizontal axle.

29. A manual powered tool according to claim 28, wherein:

said tool implement comprises one of an edger means and a leaf picker means.

* * * * *